United States Patent
Yu et al.

(10) Patent No.: US 11,537,477 B2
(45) Date of Patent: Dec. 27, 2022

(54) METHOD FOR PROTECTING APPLICATION DATA AND TERMINAL

(71) Applicant: HUAWEI TECHNOLOGIES CO., LTD., Shenzhen (CN)

(72) Inventors: Chao Yu, Nanjing (CN); Hao Chen, Shenzhen (CN); Bifeng Tong, Nanjing (CN); Chengliang Zheng, Shanghai (CN); Xiyu Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 149 days.

(21) Appl. No.: 16/977,426

(22) PCT Filed: Mar. 15, 2018

(86) PCT No.: PCT/CN2018/079209
§ 371 (c)(1),
(2) Date: Sep. 1, 2020

(87) PCT Pub. No.: WO2019/174019
PCT Pub. Date: Sep. 19, 2019

(65) Prior Publication Data
US 2021/0004302 A1    Jan. 7, 2021

(51) Int. Cl.
*G06F 16/16* (2019.01)
*G06F 11/14* (2006.01)
*G06F 21/62* (2013.01)

(52) U.S. Cl.
CPC ...... *G06F 11/1469* (2013.01); *G06F 21/6218* (2013.01); *G06F 2201/805* (2013.01)

(58) Field of Classification Search
CPC .... G06F 21/6245; G06F 16/122; G06F 16/93; G06F 16/182; G06F 16/16
See application file for complete search history.

(56) References Cited

U.S. PATENT DOCUMENTS 9,268,960 B2    2/2016   Schleifer et al.
2008/0183802 A1   7/2008   Gray et al.
(Continued)

FOREIGN PATENT DOCUMENTS

CN    104903910 A    9/2015
CN    105045686 A   11/2015
(Continued)

OTHER PUBLICATIONS

India Examination Report issued in corresponding India Application No. 202037035595, dated Aug. 2, 2021, pp. 1-6, Kolkata, India.
(Continued)

*Primary Examiner* — Cindy Nguyen
(74) *Attorney, Agent, or Firm* — Hauptman Ham, LLP

(57) ABSTRACT

A method for protecting application data includes detecting a deleting operation performed by a first application on first data. The method also includes determining, based on a preset condition, whether to delete the first data of the first application. The method further includes renaming the first data of the first application based on a determination that the first application meets the preset condition. The method additionally includes storing the renamed first data in a memory.

17 Claims, 32 Drawing Sheets

(56) References Cited

U.S. PATENT DOCUMENTS

| | | | | |
|---|---|---|---|---|
| 2013/0073963 A1* | 3/2013 | Pendergast | ........... | G11B 27/034 |
| | | | | 715/716 |
| 2013/0298234 A1 | 11/2013 | Dotan | | |
| 2014/0337296 A1 | 11/2014 | Knight | | |
| 2015/0215399 A1* | 7/2015 | Oh | ........................ | G06F 16/178 |
| | | | | 709/219 |
| 2017/0149885 A1* | 5/2017 | Kaplan | ............... | G06F 16/2379 |
| 2018/0121101 A1* | 5/2018 | Thind | ................... | G06F 3/0605 |

FOREIGN PATENT DOCUMENTS

| | | |
|---|---|---|
| CN | 105828323 A | 8/2016 |
| CN | 106506820 A | 3/2017 |

OTHER PUBLICATIONS

International Search Report issued in corresponding International Application No. PCT/CN2018/079209, dated Nov. 28, 2018, State Intellectual Property Office of the P.R. China, Beijing, China.
Microsoft Corporation, Introduction to Microsoft Sync Framework File Synchronization Provider, Oct. 2009 , 9 pages.
European Search Report issued in corresponding European Patent Application No. 18909794.2, dated Jan. 14, 2021, pp. 1-7, European Patent Office, Munich, Germany.

* cited by examiner

METHOD FOR PROTECTING APPLICATION DATA AND TERMINAL

CROSS-REFERENCE TO RELATED APPLICATIONS

This application is a national stage of International Application No. PCT/CN2018/079209, filed on Mar. 15, 2018.

TECHNICAL FIELD

This application relates to the field of communications technologies, and in particular, to a method for protecting application data and a terminal.

BACKGROUND

Currently, storage space in a terminal may be classified into internal storage space and external storage space. Each application is allocated with corresponding storage space in the internal storage space, and data in storage space corresponding to an application cannot be accessed by another application. To implement data sharing between different applications, the terminal also provides a corresponding sharing mechanism. For example, in an Android system, the terminal may implement the data sharing between different applications by using a Content Provider (Content Provider, one of components of Android) mechanism. Therefore, after an application applies for permission for a specified Content Provider, the application may perform an operation such as deleting data of another application in the Content Provider. The external storage space is storage space shared by applications. After an application applies for access permission for the external storage space, the application may access data in any location in the external storage space. That is, the application may access data of another application, or perform an operation such as deleting data of another application.

In other words, some data (application data or user data) stored in the storage space in the terminal is also exposed to some applications with permission. In this case, the data may be deleted by the applications with permission, and this may cause data loss, thereby seriously affecting security of the data.

SUMMARY

A method for protecting application data and a terminal provided in this application may prevent data in the application from being deleted mistakenly, and are beneficial to improving data security of the application in the terminal.

According to a first aspect, the method provided in this application includes: detecting a deleting operation performed by a first application on first data; determining, based on a preset condition, whether to delete the first data of the first application; renaming, when the first application meets the preset condition, the first data of the first application; and storing the renamed first data in a memory.

The first application may be a system-level application or a third-party application. For example, the first application may be an application of file management of a third party. The first application may manage and operate data and a file of another application.

The first data is any one or more of a picture, audio, a video, a document, a database, and a record in the database. For example, the first data may be "target data" in the following.

When an application in a terminal needs to delete target data, a corresponding interface in a data management module in the terminal needs to be invoked, for example, an interface of a file system, an interface of a Content Provider module, or an interface of a Service module. Therefore, when the terminal detects that the application in the terminal invokes the corresponding interface in the data management module, it may be considered that the application in the terminal starts performing a deleting behavior. In this case, the terminal suspends performing the deleting behavior, and needs to first determine whether the deleting behavior needs to be controlled. If the deleting behavior needs to be controlled, the target data is renamed.

In this way, the application in which a file of the target data is located cannot identify the file of the target data. In this case, for the application in which the file of the target data is located, the file of the target data is invisible. For a user, it may be considered that the file of the target data is deleted.

Optionally, the user may view the renamed file of the target data in a directory at a specified location in the terminal (for example, in a recycle bin of the terminal or modules with recycle bin functions of applications). The terminal may further record file information of the target data, and the file information of the target data includes but is not limited to an original file name of the target data, and an original location, deletion time, and the like of the target data.

In this way, the user may rename, based on the file information of the target data, the file of the target data to an original file name, so that the file of the target data in the original application is restored to a visible state. For the user, it may be considered that the deleted file of the target data is restored. The user may also delete the file of the target data from the directory at the specified location. Alternatively, the terminal may automatically delete, after a preset time period, a file of data in a directory at a specified location by default, to save storage space of the terminal.

In a possible design, the determining, based on the first application, whether the preset condition is met includes: determining, based on the first application, whether the first application is a preset application.

In some examples, the terminal may set a white list for controlling a deleting operation of an application. An application in the white list is the application that does not need to be controlled. For example, the terminal may set an application in the white list in a constraint condition of the application in a subject control policy. In this way, when the terminal detects a deleting operation of an application, and determines the application to be an application in the white list, the terminal may directly determine not to control the deleting operation. Target data is deleted by the application.

In some examples, the terminal may set a black list for controlling a deleting operation of an application. An application in the black list is the application that needs to be controlled. For example, the terminal may set an application in the black list in a constraint condition of the application in a subject control policy. In this way, when the terminal detects a deleting operation of an application, and the application is determined to be an application in the black list, the terminal may directly determine to control the deleting operation, that is, the terminal renames the target data.

In a possible design, the determining, based on the first application, whether the preset condition is met includes: the first application is the preset application.

In a possible design, the determining, based on the first application, whether the preset condition is met includes: determining, based on the first application, whether the first application is an application of a preset type, and whether the first application is an application in a preset state.

In a possible design, the determining, based on the first application, whether the preset condition is met includes: the first application is the application of the preset type, and the first application is the application in the preset state, where the application of the preset type is a third-party application, and the application in the preset state is an application running in a background.

In some examples, for control of an application that is neither white-listed nor black-listed, the terminal may also set a more detailed control policy.

In some examples, the terminal may set an application (a preset application) that needs to be controlled in the constraint condition of the application in the subject control policy, and further needs to set a type (a preset type) of the application that needs to be controlled in the constraint condition of the application type, and set a status (a preset state) of the application that needs to be controlled in the constraint condition of the application state.

For example, the preset type may be set as that a preset state of a "third-party application" is a "background running state".

That is, when the terminal determines that an application is a preset application, the terminal needs to further determine whether a type and a status of the application meet a condition. When the terminal determines that the type of the application is a "third-party application" and the status of the application is a "background running state", the terminal determines that the deleting operation of the application needs to be controlled, that is, the terminal renames the target data.

In a possible design, the determining, based on the first application, whether the preset condition is met includes: determining, based on the first data of the first application, whether the first data is located at a preset file location, and whether the first data is a preset file type.

In a possible design, the renaming, when the first application meets the preset condition, the first data of the first application includes: determining, based on the first data of the first application, that the first data is located at the preset file location, and the first data is the preset file type, and renaming the first data of the first application.

In some examples, the terminal may set an application (a preset application) that needs to be controlled in the constraint condition of the application in the subject control policy, further needs to set a file location (a preset file location) of the target data that needs to be controlled in the constraint condition of the file location in an object control policy, and set a file type (a preset file type) of the target data that needs to be controlled in the constraint condition of the file location in the object control policy.

That is, when the terminal determines that an application is a preset application, the terminal needs to further determine whether a file location and a file type of target data meet a condition. When the terminal determines that the file location of the target data is located at the preset file location, and the file type of the target data is the preset file type, the terminal determines that the deleting operation of the application needs to be controlled, that is, the terminal renames the target data.

In a possible design, the determining, based on the first application, whether the preset condition is met includes: determining, based on the first data of the first application, whether the first data meets a preset file size, and whether creation time of the first data is in a preset time period.

In a possible design, the renaming, when the first application meets the preset condition, the first data of the first application includes: determining, based on the first data of the first application, that the first data is located at the preset file location, the first data is the preset file type, the first data meets the preset file size, and the creation time of the first data is located in the preset time period; and renaming the first data of the first application.

Optionally, the terminal may set an application (a preset application) that needs to be controlled in the constraint condition of the application in the subject control policy, and further needs to set a file size (a preset file size) of the target data that needs to be controlled in the constraint condition of the file size in the object control policy, and set an interval (a preset time period) of file creation time of the target data that needs to be controlled in the constraint condition of the file creation time in the object control policy.

That is, when the terminal determines that an application is a preset application, the terminal needs to further determine whether a file size and file creation time of target data meet a condition. When the terminal determines that the file size of the target data is a preset file size, and the file creation time of the target data is in a preset time period, the terminal determines that the deleting operation of the application needs to be controlled, that is, the terminal renames the target data.

In a possible design, the renaming, by the terminal, the first data of the application includes: renaming, by the terminal, a file name corresponding to the first data of the first application; or renaming, by the terminal, a file location of the first data of the first application; or renaming, by the terminal, a file name corresponding to the first data of the first application and a file location of the first data of the first application.

According to a second aspect, this application provides a method, including: detecting a deleting operation performed by an application on first data; determining, based on a preset condition, whether to delete the first data of the first application; and if the first application meets the preset condition, backing up the first data and deleting the original first data.

The first application may be a system-level application or a third-party application. For example, the first application may be an application of file management of a third party. The first application may manage and operate data and a file of another application.

The first data is any one or more of a picture, audio, a video, a document, a database, and a record in the database. For example, the first data may be "target data" in the following.

The terminal may back up the target data in a specified directory (for example, in a recycle bin of the terminal or modules with recycle bin functions of all application). After backup is successfully implemented, the terminal continues to perform an operation of deleting the target data. In other words, an application performing a deleting operation deletes target data, but the target data may still be viewed and operated in a specified directory.

In a possible design, the determining, based on the first application, whether the preset condition is met includes: determining, based on the first application, whether the first application is a preset application.

In a possible design, the determining, based on the first application, whether the preset condition is met includes: the first application is the preset application.

In a possible design, the determining, based on the first application, whether the preset condition is met includes: determining, based on the first application, whether the first application is an application of a preset type, and whether the first application is an application in a preset state.

In a possible design, the determining, based on the first application, whether the preset condition is met includes: the first application is the application of the preset type, and the first application is the application in the preset state, where the application of the preset type is a third-party application, and the application in the preset state is an application running in a background.

In a possible design, the determining, based on the first application, whether the preset condition is met includes: determining, based on the first data of the first application, whether the first data is located at a preset file location, and whether the first data is a preset file type.

In a possible design, the renaming, when the first application meets the preset condition, the first data of the first application includes: determining, based on the first data of the first application, that the first data is located at the preset file location, and the first data is the preset file type; and backing up the first data of the first application, and deleting the original first data.

According to a third aspect, a terminal includes: a detecting unit, configured to detect a deleting operation performed by a first application on first data; a determining unit, configured to determine, based on a preset condition, whether to delete the first data of the first application; a processing unit, configured to rename, when the first application meets the preset condition, the first data of the first application; and a storing unit, configured to store the renamed first data in a memory.

In a possible design, the determining unit is configured to determine, based on the first application, whether the first application is a preset application.

In a possible design, the determining unit is further configured to determine that the first application is the preset application.

In a possible design, the determining unit is further configured to determine, based on the first application, whether the first application is an application of a preset type, and whether the first application is an application in a preset state.

In a possible design, the determining unit is further configured to determine that the first application is the application of the preset type, and the first application is the application in the preset state, where the application of the preset type is a third-party application, and the application in the preset state is an application running in a background.

In a possible design, the determining unit is further configured to determine, based on the first data of the first application, whether the first data is located at a preset file location, and whether the first data is a preset file type.

In a possible design, the processing unit is further configured to rename the first data of the first application after the determining unit determines, based on the first data of the first application, that the first data is located at the preset file location, and the first data is the preset file type.

In a possible design, the determining unit is further configured to determine, based on the first data of the first application, whether the first data meets a preset file size, and whether creation time of the first data is in a preset time period.

In a possible design, the processing unit is further configured to rename the first data of the first application after the determining unit determines, based on the first data of the first application, that the first data is located at the preset file location, the first data is the preset file type, the first data meets the preset file size, and the creation time of the first data is in the preset time period.

In a possible design, the processing unit is further configured to rename a file name corresponding to the first data of the first application; or rename a file location of the first data of the first application; or renaming a file name corresponding to the first data of the first application and a file location of the first data of the first application.

In a possible design, the first application is a system-level application or the third-party application.

In a possible design, the first data is any one or more of a picture, audio, a video, a document, a database, and a record in the database.

According to a fourth aspect, a terminal includes: a processor, a memory, and a touchscreen, where the memory and the touchscreen are coupled to the processor, the memory is configured to store computer program code, the computer program code includes a computer instruction, and when the processor reads the computer instruction from the memory, the method in any possible design method of the first aspect and the second aspect is performed.

According to a fifth aspect, a computer storage medium includes a computer instruction, and when the computer instruction is run in a terminal, the terminal is enabled to perform the method in any possible design method of the first aspect and the second aspect.

According to a sixth aspect, this application relates to a computer program product, and when the computer program product is run in a computer, the computer is enabled to perform the method in any possible design method of the first aspect and the second aspect.

DESCRIPTION OF EMBODIMENTS

To more clearly understand the technical solution provided in the embodiments of this application, a process in which an application deletes data in storage space is first briefly described with reference to a framework structure diagram of a terminal.

Figure 1:
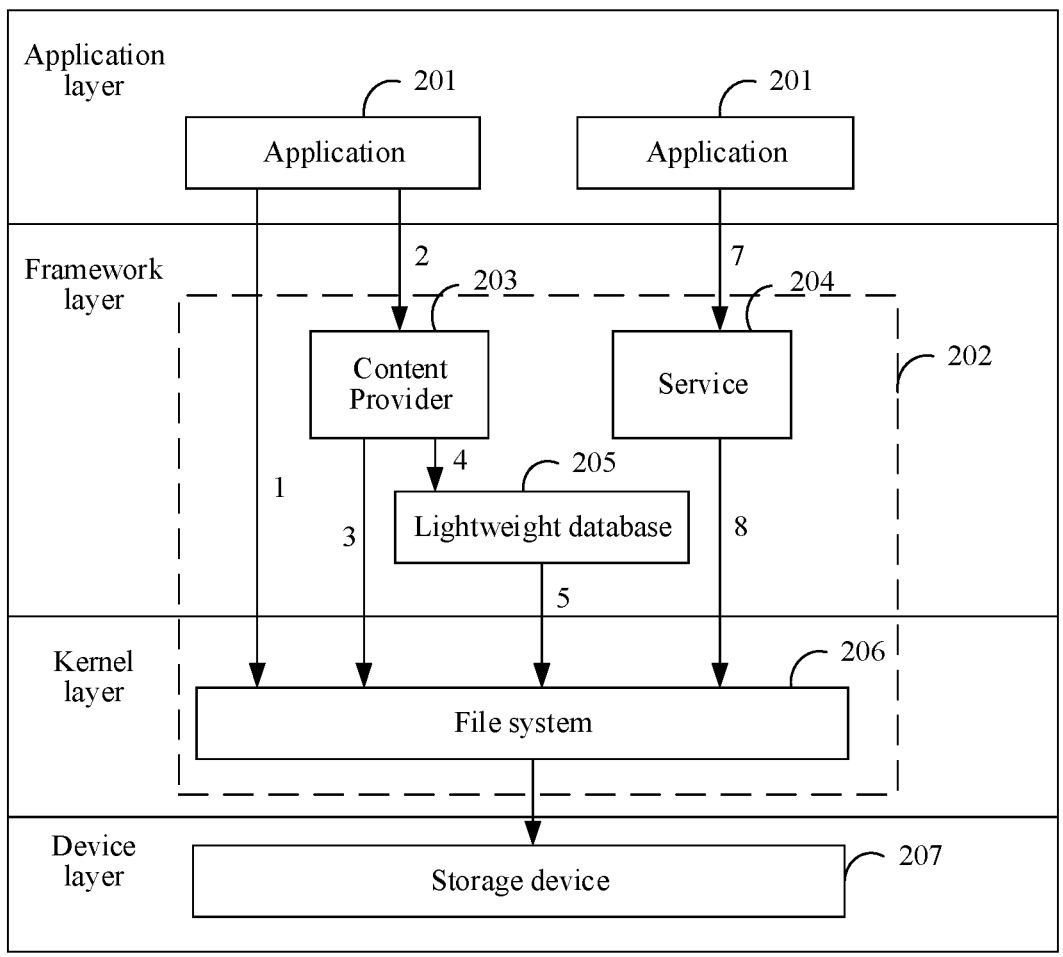
FIG. 1 is a schematic structural diagram of a terminal in the prior art.

FIG. 1 is a schematic structural diagram of a framework of a terminal. The terminal includes at least one application module 201, a data management module 202, and a storage device 207.

The application module 201 is located at an application layer of the terminal, and may include, for example, a preloaded application and/or a third-party application.

The data management module 202 includes: a Content Provider module 203, a Service module 204, an SQLite database (lightweight database) 205, and a file system module 206.

The Content Provider module 203 is located at a framework layer of the terminal and provides a unified data sharing service for the application module 201. The module includes instances such as a Phone Provider (e.g., SMS message and MMS message provider), a Media Provider, and a Contact Provider.

The Service module 204 is located at the framework layer of the terminal, and provides a service of deleting, by the application 201, data stored in the storage device 207 by using an interface of the file system module 207.

The SQLite database 205 is located at the framework layer of the terminal and is configured to store data metadata information stored in the storage device 207, where the metadata information is used to describe a status of the data stored in the storage device 207. For example, when the data stored in the storage device 207 is a picture, the metadata information may include a storage location or a picture size of the picture, a geographical location at which the picture is generated, and the like. The metadata information may be used to search for an index of corresponding data.

The file system module 206 is located at a kernel layer of the terminal and is configured to provide a file service for a software module at an upper layer (e.g., an application layer or the framework layer). The file system 206 includes all readable and writable file systems of the terminal, for example, an ext4 file system and an f2fs file system.

The storage device 207 is located at a device layer and provides a data storage service. The file system module 206 at the kernel layer may use the storage device 207 to perform a data persistence operation, to store user data. For example, the storage device 207 may be an embedded Multi Media Card (eMMC), or a Universal Flash Storage (UFS).

Generally, the application 201 deletes the data in the storage device 207 in three manners. In a first manner, the application 201 directly invokes an interface of the file system 206 (for example, an interface deleting a file node: unlink, and an interface deleting a directory: rmdir) to delete the data in the storage device 207 (indicated by an arrow 1). In a second manner, the application 201 deletes the data in the storage device 207 (indicated by an arrow 2, an arrow 3, an arrow 4, and an arrow 5) by invoking an interface (a delete interface) of the Content Provider module 203. In a third manner, the application 201 deletes the data in the storage device 207 by invoking an interface of the Service module 204 (different services may define interfaces independently). For specific execution of a deleting behavior, reference may be made to the prior art, and details are not described herein again.

It should be noted that the storage device 207 includes internal storage space and external storage space. From the foregoing descriptions, it can be learned that, in the internal storage space, the terminal provides a sharing mechanism, such as the Content Provider, to implement data sharing between different applications. In other words, the application in the terminal may delete, in the foregoing second manner, data that is stored in the internal storage space by another application. In the external storage space, after an application applies for access permission for the external storage space, the application may access data in any location in the external storage space. In other words, an application may access data of another application, or perform, by using any one of the foregoing methods, an operation such as deleting data that is stored in the external storage space by the another application.

It can be learned that, when important data of some applications is deleted by another application mistakenly, the applications may not run properly. Alternatively, deleting some private data of a user mistakenly, may cause severe impact on the user. Therefore, data stored in a storage device needs to be protected in a deletion process.

Therefore, an embodiment of this application provides a method for protecting application data, and the method may be applied to a process in which a terminal deletes data (for example, application data and user data) in storage space.

For example, the terminal in this application may be a mobile phone (such as a mobile phone 100 shown in FIG. 2) capable of installing an application and displaying an application icon, a tablet computer, a personal computer (PC), a personal digital assistant (PDA), a smart watch, a netbook, a wearable electronic device, an augmented reality (AR) device, a virtual reality (VR) device, and the like, and a specific form of the terminal is not specially limited in this application.

Figure 2:
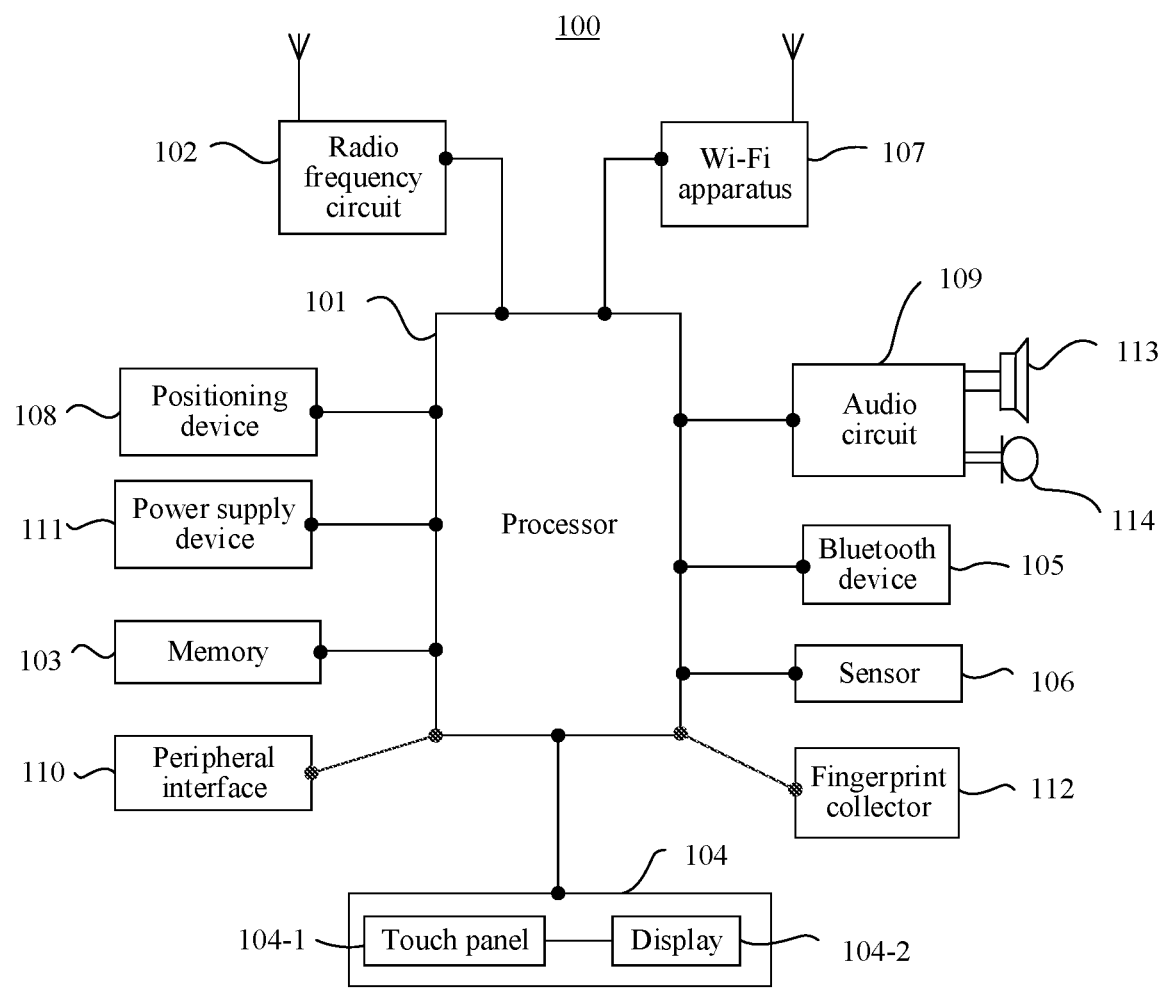
FIG. 2 is a schematic structural diagram 1 of a terminal according to an embodiment of this application.

As shown in FIG. 2, for example, the mobile phone 100 is the foregoing terminal, and the mobile phone 100 may include components such as a processor 101, a radio frequency (RF) circuit 102, a memory 103, a touchscreen 104, a Bluetooth device 105, one or more sensors 106, a wireless fidelity (WI-FI) apparatus 107, a positioning apparatus 108, an audio circuit 109, a peripheral interface 110, and a power supply apparatus 111. The components may communicate with each other by using one or more communications buses or signal lines (not shown in FIG. 2). A person skilled in the art may understand that the hardware structure shown in FIG. 2 does not constitute any limitation on the mobile phone, and the mobile phone 100 may include more or fewer components than those shown in the figure, or some components may be combined, or different component configurations may be used.

The following describes components of the mobile phone 100 with reference to FIG. 2:

The processor 101 is a control center of the mobile phone 100, and is connected to various parts of the mobile phone 100 by using various interfaces and lines. The processor 101 performs various functions of the mobile phone 100 and processes data by running or performing an application stored in the memory 103, and invoking the data stored in the memory 103. In some embodiments, the processor 101 may include one or more processing units. For example, the processor 101 may be a Kirin 960 chip.

The radio frequency circuit 102 may be configured to receive and send a radio signal in an information receiving and sending process or a call process. Particularly, after receiving downlink data from a base station, the radio frequency circuit 102 may send the downlink data to the processor 101 for processing, and sends related uplink data to the base station. Generally, the radio frequency circuit includes but is not limited to an antenna, at least one amplifier, a transceiver, a coupler, a low noise amplifier, a duplexer, and the like. In addition, the radio frequency circuit 102 may also communicate with another device through wireless communication. The wireless communication may use any communications standard or protocol, including but not limited to, global system for mobile communications, general packet radio service, code division multiple access, wideband code division multiple access, long term evolution, an email, an SMS message service, and the like.

It may be understood that the processor 101 may include a baseband processor and an application processor.

The memory 103 is configured to store an application and data. The processor 101 performs various functions of the mobile phone 100 and processes data by running the application and the data stored in the memory 103. The memory 103 mainly includes a program storage area and a data storage area. The program storage area may store an operating system, and an application required by at least one function (for example, a sound playback function or an image display function). The data storage area may store data (for example, audio data or an address book) created based on use of the mobile phone 100. In addition, the memory 103 may include a high-speed random access memory (RAM), and may further include a non-volatile memory such as a magnetic disk storage device, a flash memory device, or another volatile solid-state memory device. The memory 103 may store various operating systems, such as an iOS® operating system developed by Apple Inc. and an Android® operating system developed by Google Inc. The memory 103 may be independent and connected to the processor 101 by using the communications bus; or the memory 103 may be integrated with the processor 101. In this embodiment of this application, the memory 103 includes the storage device 207.

The touchscreen 104 may include a touch panel 104-1 and a display 104-2.

The touch panel 104-1 can collect a touch event performed by a user on or near the mobile phone 100 (for example, an operation performed by the user on the touch panel 104-1 or near the touch panel 104-1 by using any suitable object such as a finger or a stylus), and send collected touch information to another component (such as the processor 101). The touch event of the user near the touch panel 104-1 may be referred to as floating touch control. The floating touch control may mean that a user does not need to directly touch a touch panel to select, move, or drag a target (for example, an icon), and instead, the user only needs to be near a device to perform a desired function. In addition, the touch panel 104-1 may be implemented in a plurality of types, such as a resistive type, a capacitive type, an infrared type, and a surface acoustic wave type.

The display (also referred to as a display screen) 104-2 may be configured to display information entered by the user or information provided for the user, and various menus of the mobile phone 100. The display 104-2 may be configured in a form such as a liquid crystal display or an organic light emitting diode. The touch panel 104-1 may cover the display 104-2. When detecting a touch event on or near the touch panel 104-1, the touch panel 104-1 transfers the touch event to the processor 101 to determine a type of the touch event. Then, the processor 101 may provide corresponding visual output on the display 104-2 based on the type of the touch event. In FIG. 2, the touch panel 104-1 and the display screen 104-2 act as two independent components to respectively implement input and output functions of the mobile phone 100. However, in some embodiments, the touch panel 104-1 and the display screen 104-2 may be integrated to implement the input and output functions of the mobile phone 100. It may be understood that the touchscreen 104 is formed by stacking a plurality of layers of materials, and details are not described in this embodiment of this application. In addition, the touch panel 104-1 may be configured on a front side of the mobile phone 100 in a form of a full panel, and the display screen 104-2 may also be configured on the front side of the mobile phone 100 in the form of the full panel, so that the front side of the mobile phone may be implemented as a frameless structure, such as a full screen mobile phone.

In addition, the mobile phone 100 may also have a fingerprint recognition function. For example, a fingerprint sensor 112 may be configured on a back side of the mobile phone 100 (for example, below the rear-facing camera), or the fingerprint sensor 112 may be configured on the front side of the mobile phone 100 (for example, below the touchscreen 104). For another example, a fingerprint collector 112 may be configured in the touchscreen 104 to implement the fingerprint recognition function, that is, the fingerprint collector 112 and the touchscreen 104 may be integrated to implement the fingerprint recognition function of the mobile phone 100. In this case, the fingerprint collector 112 is configured in the touchscreen 104, may be a part of the touchscreen 104, or may be configured in the touchscreen 104 in another manner. A main component of the fingerprint collector 112 in this embodiment of this application is the fingerprint sensor, and the fingerprint sensor may use any type of sensing technology, which includes but is not limited to an optical sensing technology, a capacitive sensing technology, a piezoelectric sensing technology, an ultrasonic sensing technology, and the like.

The mobile phone 100 may further include a Bluetooth device 105, which is used to implement data exchange between the mobile phone 100 and another short-range device (for example, a mobile phone or a smart watch). The Bluetooth device in this embodiment of this application may be an integrated circuit, a Bluetooth chip, or the like.

The mobile phone 100 may further include at least one type of sensor 106, such as a light sensor, a motion sensor, and another sensor. For example, the light sensor may include an ambient light sensor and a proximity sensor. The ambient light sensor may adjust luminance of a display of the touchscreen 104 based on intensity of ambient light. The proximity sensor may power off the display when the mobile phone 100 approaches an ear. As one type of the motion sensor, an accelerometer sensor may detect acceleration values in various directions (usually on three axes). The accelerometer sensor may detect a value and a direction of gravity when the accelerometer sensor is stationary, and may be applied to an application for recognizing a mobile phone posture (such as switching between a landscape screen and a vertical screen, a related game, and magnetometer posture calibration), a function related to vibration recognition (such as a pedometer and a knock), and the like. Other sensors such as a gyroscope, a barometer, a hygrometer, a thermometer, and an infrared sensor may be further configured in the mobile phone 100, and details are not described herein.

The Wi-Fi apparatus 107 is configured to provide, for the mobile phone 100, network access that complies with a Wi-Fi-related standard protocol. The mobile phone 100 may access a Wi-Fi access point by using the Wi-Fi apparatus 107, so that the user can receive and send an email, browse a web page, access streaming media, and so on. The Wi-Fi apparatus 107 provides wireless broadband Internet access for the user. In some other embodiments, the Wi-Fi apparatus 107 may also serve as a Wi-Fi wireless access point to provide Wi-Fi network access to another device.

The positioning apparatus 108 is configured to provide a geographic location for the mobile phone 100. It may be understood that the positioning apparatus 108 may be a receiver of a positioning system such as a Global Positioning System (GPS), a BeiDou Navigation Satellite System, or a Russian GLONASS. After receiving the geographic location sent by the positioning system, the positioning apparatus 108 sends the information to the processor 101 for processing, or sends the information to the memory 103 for storage. In some other embodiments, the positioning apparatus 108 may also be a receiver of an Assisted Global Positioning System (AGPS). The AGPS system assists the positioning apparatus 108 in implementing ranging and positioning services by acting as an assisted server. In this case, the assisted positioning server communicates with a device such as the positioning apparatus 108 (e.g., the GPS receiver) of the mobile phone 100 through a wireless communications network, to provide positioning assistance. In some other embodiments, the positioning apparatus 108 may alternatively be a positioning technology that is based on the Wi-Fi access point. Because each Wi-Fi access point has a globally unique (e.g., Media Access Control, MAC) address, a device may scan and collect a broadcast signal of a surrounding Wi-Fi access point when Wi-Fi is started, so that a MAC address broadcasted by the Wi-Fi access point may be obtained; and a device sends data (for example, the MAC address) capable of indicating the WI-FI access point to a Location Server through a wireless communications network. The location server retrieves a geographic location of each Wi-Fi access point, calculates the geographic location of the device with reference to a strength of the WI-FI broadcast signal, and sends the geographic location to the positioning apparatus 108 of the device.

The audio circuit 109, a speaker 113, and a microphone 114 may provide an audio interface between the user and the mobile phone 100. The audio circuit 109 may transmit, to the speaker 113, an electrical signal converted from received audio data, and the speaker 113 converts the electrical signal into a sound signal for outputting. In addition, the microphone 114 converts a collected sound signal into an electrical signal. The audio circuit 109 receives the electrical signal, converts the electrical signal into audio data, and then outputs the audio data to the RF circuit 102, to send the audio data to, for example, another mobile phone, or outputs the audio data to the memory 103 for further processing.

The peripheral interface 110 is configured to provide various interfaces for an external input/output device (for example, a keyboard, a mouse, an external display, an external memory, and a subscriber identity module card). For example, a host computer is connected to a mouse through a Universal Serial Bus (USB) interface, and is connected to a subscriber identification module (SIM) card provided by a telecommunication operator through a metal contact on a subscriber identity module card slot. The peripheral interface 110 may be configured to couple the external input/output peripheral device to the processor 101 and the memory 103.

The mobile phone 100 may further include the power supply apparatus 111 (for example, a battery and a power supply management chip) that supplies power to the components. The battery may be logically connected to the processor 101 by using the power supply management chip, so that functions such as charging, discharging, and power consumption management are implemented by using the power supply apparatus 111.

Although not shown in FIG. 2, the mobile phone 100 may further include a camera (a front-facing camera and/or a rear-facing camera), a camera flash, a micro projection apparatus, a Near Field Communication (NFC) apparatus, and the like. Details are not described herein.

All methods in the following embodiments may all be implemented in the mobile phone 100 having the foregoing hardware structure.

Figure 3:
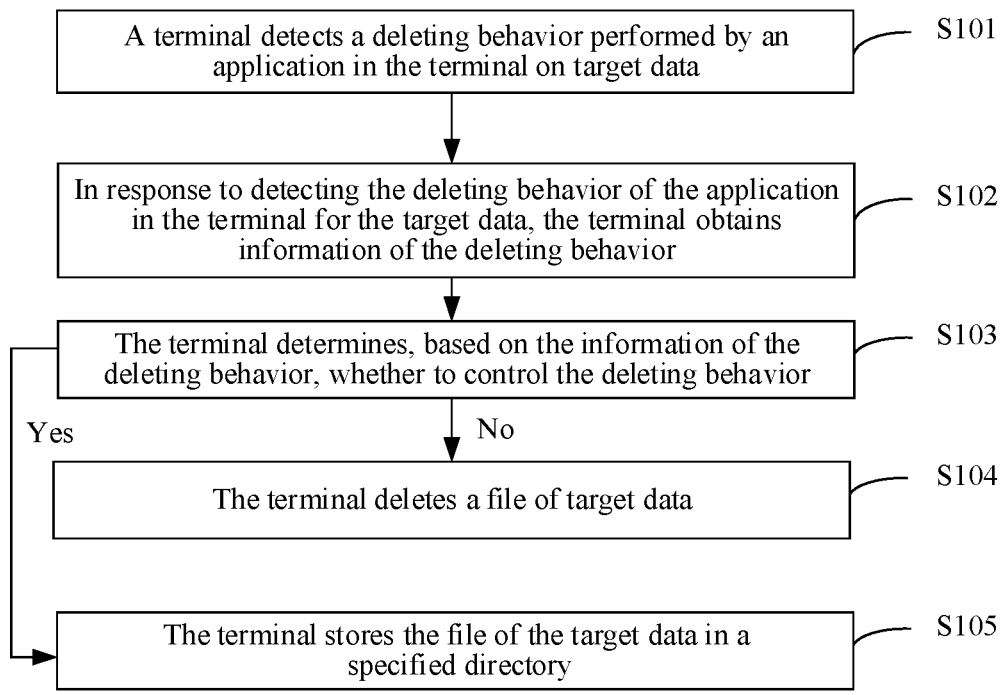
FIG. 3 is a schematic flowchart 1 of a method for protecting application data according to an embodiment of this application.

FIG. 3 is a flowchart of a method for protecting application data according to an embodiment of this application, and the method includes:

S101. A terminal detects a deleting behavior performed by an application in the terminal on target data.

It can be learned from the foregoing description that when an application in the terminal needs to delete data, the application needs to invoke a corresponding interface in the data management module, for example, an interface of a file system, an interface of a Content Provider module, or an interface of a Service module. Therefore, when the terminal detects that the application in the terminal invokes the corresponding interface in the data management module, it may be considered that the application in the terminal starts to perform the deleting behavior. In this case, the terminal suspends performing the deleting behavior, and needs to determine whether the deleting behavior needs to be controlled.

S102. In response to detecting the deleting behavior of the application in the terminal for the target data, the terminal obtains information of the deleting behavior.

The information of the deleting behavior includes subject information and object information. For example, the subject information includes information of an application performing the deleting behavior, and includes but is not limited to a name of the application, a type of the application (an application of a system, an application preset in the terminal, or a third-party application), a status of the application (a foreground running state or a background running state), and the like. The object information includes information of the target data of the deleting behavior, and the information includes but is not limited to a file name, a file type, a file location, file creation time, a file size, and the like of the target data. The target data includes but is not limited to a picture, audio, a video, a document, a database (for example, a short message service message, contact information, or a call record), a record in the database, and the like.

S103. The terminal determines, based on the information of the deleting behavior, whether to control the deleting behavior. If control is not required, the terminal performs step S104. If control is required, the terminal performs step S105.

The terminal compares the obtained information of the deleting behavior with a preset control policy, to determine whether to control the deleting behavior. If the information of the deleting behavior meets the preset control policy, the deleting behavior needs to be controlled. If the information of the deleting behavior does not meet the preset control policy, the deleting behavior does not need to be controlled.

The preset control policy includes a subject control policy and an object control policy. For example, the subject control policy includes but is not limited to a constraint condition of an application, a constraint condition of an application type, and a constraint condition of an application state. The constraint condition of the application includes constraining which application that needs to be controlled when a deleting operation is performed. The constraint condition of the application type includes constraining which type of application that needs to be controlled when a deleting operation is performed. The constraint condition of the application state includes constraining an application of which state that needs to be controlled when a deleting operation is performed. The object control policy includes but is not limited to a constraint condition of a file location, a constraint condition of a file type, a constraint condition of a file size, and a constraint condition of file creation time. The constraint condition of a file location includes constraining data under which directory that needs to be controlled when the data is deleted. The constraint condition of a file type includes constraining data of which file type that needs to be controlled when the data is deleted. The constraint condition of a file size includes constraining data whose file size in which ranges that needs to be controlled when the data is deleted. The constraint condition of file creation time includes constraining data that is created in which time range and that needs to be controlled when the data is deleted.

In other words, determining of the subject information includes but is not limited to: whether the application is prohibited from supporting a deleting operation; whether the application is allowed to perform a deleting operation; whether the application of this type is allowed to perform a deleting operation; whether the application is allowed to perform a deleting operation when the application is in the foreground running state or the background running state, and the like. Determining the object information includes but is not limited to: whether the application is allowed to perform a deleting operation on a file under the directory; whether the application is allowed to perform a deleting operation on a file of this type; whether the application is allowed to perform a deleting operation on the file created on this time point; whether the application is allowed to perform a deleting operation on a file of this file size, and the like.

The preset control policy may be a control policy set by the terminal by default, or a control policy set by the user independently, or a control policy pushed by the cloud server to the terminal, or a combination thereof, and this is not limited in this embodiment of this application.

S104. The terminal deletes a file of target data.

The terminal continues to perform the operation of deleting the target data, and deletes the file of the target data from the storage device.

S105. The terminal stores the file of the target data in a specified directory.

In some examples, the terminal may stop performing the operation of deleting the target data, and rename the file of the target data. For example, renaming the file name and/or the file location are included, so that the application in which the file of the target data is located does not identify the file of the target data. In this way, for an application in which the file of the target data is located, the file of the target data is in an invisible state, and for the user, it may be considered that the file of target data is deleted.

Optionally, the user may view the renamed file of the target data in a directory at a specified location in the terminal (for example, in a recycle bin of the terminal or modules with recycle bin functions of applications). The terminal may also record file information of the target data, and the file information of the target data includes but is not limited to an original file name of the target data, an original location, deletion time, and the like of the target data. In this way, the user may rename, based on the file information of the target data, the file of the target data to the original file name, so that the file of the target data is restored to a visible state in the original application. For the user, it may be considered that the deleted file of the target data is restored. The user may also delete the file of the target data from the directory at the specified location. Alternatively, the terminal may automatically delete, after a preset time period, a file of data in a directory at a specified location by default, to save storage space of the terminal.

It should be noted that, after the terminal renames the file of the target data, the terminal may display an original file name of the target data in a directory at a specified location. In this way, the user can distinguish, in the directory at the specified location, that the file is the originally deleted file of the target data. Optionally, the terminal may also provide a file preview of the renamed target data, and then the user can identify the file as the originally deleted file of the target data through preview. Optionally, the terminal may also rename partial file information (for example, an extension name of the file) of the target data, and reserves the partial file information. The reserved the partial file information may enable the user to identify the file as the originally deleted file of the target data. This is not limited in this embodiment of this application.

In some other examples, the terminal may back up the target data in a specified directory (for example, in a recycle bin of the terminal or modules with recycle bin functions of applications). After backup is successfully implemented, the terminal continues to perform an operation of deleting the target data. In other words, an application performing a deleting operation deletes target data, but the target data may still be viewed and operated in a specified directory.

It can be learned that, in the technical solution provided in this embodiment of this application determines, by monitoring the deleting behavior of the terminal, whether the deleting behavior needs to be controlled or not is determined based on a preset control policy. If the deleting behavior is determined to be controlled, a file of target data of the deleting behavior is moved to a directory at a specified location. For a deleting behavior that needs to be controlled, because the terminal does not directly delete the file of the target data, but moves the file of the target data to the directory at the specified location, the user may further retrieve the file of the target data by using the directory at the specified location. This helps avoid unauthorized deletion or accidental deletion of the target data, and helps protect security of data in the terminal.

The following describes an application scenario of the technical solution in this embodiment of this application by using an example with reference to an actual application scenario.

Application scenario 1: The terminal may set a white list for controlling a deleting operation of the application. An application in the white list is the application that does not need to be controlled. For example, the terminal may set an application in the white list in a constraint condition of the application in a subject control policy. In this way, when the terminal detects a deleting operation of an application, and determines the application to be an application in the white list, the terminal may directly determine not to control the deleting operation. Target data is deleted by the application.

Application scenario 2: The terminal may set a black list for controlling a deleting operation of the application. An application in the black list is the application that needs to be controlled. For example, the terminal may set an application in the black list in a constraint condition of the application in a subject control policy. In this way, when the terminal detects a deleting operation of an application, and determines the application to be an application in the black list, the terminal may directly determine to control the deleting operation, that is, the terminal renames target data or backs up the target data before deleting the target data.

Application scenario 3: For control of an application that is neither white-listed nor black-listed, the terminal may also set a more detailed control policy.

In some examples, the terminal may set an application (a preset application) that needs to be controlled in the constraint condition of the application in the subject control policy, and further needs to set a type (a preset type) of the application that needs to be controlled in the constraint condition of the application type, and set a status (a preset state) of the application that needs to be controlled in the constraint condition of the application state.

For example, the preset type may be set as that a preset state of a "third-party application" is a "background running state".

That is, when the terminal determines that an application is a preset application, the terminal needs to further determine whether a type and a status of the application meet a condition. When the terminal determines that the type of the application is a "third-party application" and the status of the application is a "background running state", the terminal determines that the deleting operation of the application needs to be controlled, that is, the terminal renames the target data or backs up the target data before deleting the target data.

In some other examples, the terminal may set an application (a preset application) that needs to be controlled in the constraint condition of the application in the subject control policy, further needs to set a file location (a preset file location) of the target data that needs to be controlled in the constraint condition of the file location in an object control policy, and set a file type (a preset file type) of the target data that needs to be controlled in the constraint condition of the file location in the object control policy.

That is, when the terminal determines that an application is a preset application, the terminal needs to further determine whether the file location and the file type of the target data meet a condition. When the terminal determines that the file location of the target data is located at the preset file location, and the file type of the target data is the preset file type, it is determined that the deleting operation of the application needs to be controlled, that is, the terminal renames target data or backs up the target data before deleting the target data.

Optionally, the terminal may set an application (a preset application) that needs to be controlled in the constraint condition of the application in the subject control policy, further needs to set a file size (a preset file size) of the target data that needs to be controlled in the constraint condition of the file size in the object control policy, and set an interval (a preset time period) of file creation time of the target data that needs to be controlled in the constraint condition of the file creation time in the object control policy.

That is, when the terminal determines that an application is a preset application, the terminal needs to further determine whether a file size and file creation time of target data meet a condition. When the terminal determines that the file size of the target data is a preset file size, and the file creation time of the target data is in a preset time period, the terminal determines that the deleting operation of the application needs to be controlled, that is, the terminal renames the target data or backs up the target data before deleting the target data.

It should be noted that content included in the subject control policy, content included in the object control policy, and a combination manner of the subject control policy and the object control policy are not limited in this embodiment of this application.

Figure 4:
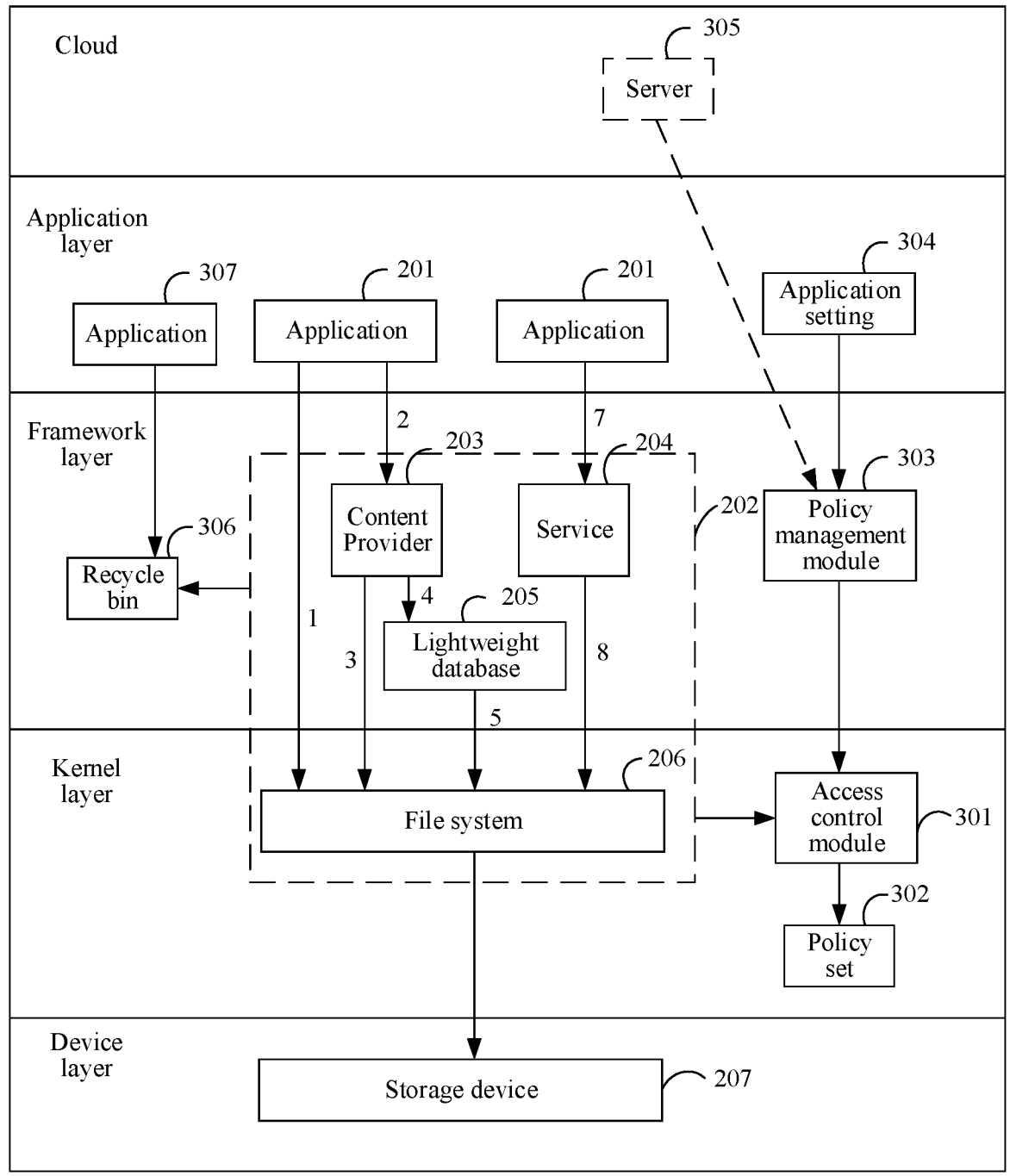
FIG. 4 is a schematic structural diagram 2 of a terminal according to an embodiment of this application.

FIG. 4 is a schematic structural diagram of a framework of a terminal according to an embodiment of this application. That is, based on the terminal shown in FIG. 2, an access control module 301, a policy set 302, a policy management module 303, an application setting 304, a recycle bin 306, and an application 307 are added.

The access control module 301 is configured to provide a query interface to the data management module 202. The access control module 301 is further configured to determine, based on the information of the deleting behavior transmitted by the data management module 202, whether the deleting behavior needs to be controlled. The access control module 301 is further configured to provide a query for the policy management module 303, provide an interface for modifying the policy set 302, and so on.

The policy set 302 is configured to store a control policy that is set by a user or pushed by a cloud server, and the control policy includes but is not limited to a subject control policy and an object control policy. For details, refer to a description of the control policy in step S103. Details are not described herein again.

The policy management module 303 is configured to manage the control policy in the policy set 302 by using the interface of the access control module 301, and the management includes but is not limited to adding, modifying, and deleting the control policy.

The application setting module 304 provides a user interface for managing the control policy. It should be noted that, the module may also add a corresponding function to an existing application module (for example, may add a corresponding function to the "Settings" application).

The recycle bin 306 provides storage for data that is renamed by the data management module 202, and provides an interface for an upper-layer application program to query, browse, restore, and delete files of the data.

The application module 307 provides an interactive interface for the user to view and operate data in the recycle bin 306. It should be noted that, in this application, a corresponding interface may also be added to each application, and is configured to view and operate corresponding data in the recycle bin 306.

Furthermore, the terminal may further include a server 305, configured to push a corresponding control policy to the policy management module 303.

Figure 5A:
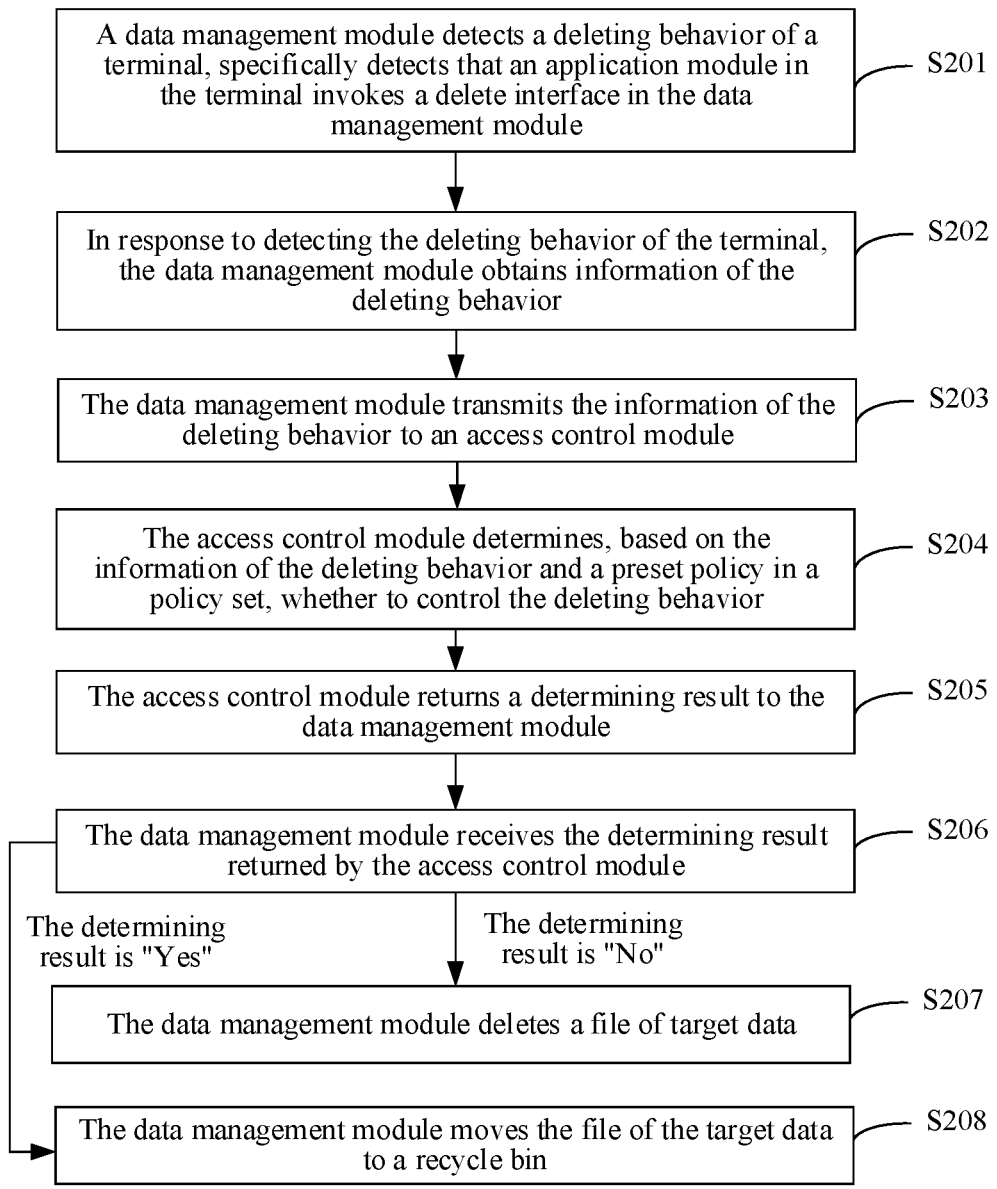
FIG. 5A is a schematic flowchart 2 of a method for protecting application data according to an embodiment of this application.

The following describes in detail the technical solution of this application by using an example in which a method for protecting application data provided in this application is applied to the terminal shown in FIG. 4. As shown in FIG. 5A, the technical solution provided in this application includes:

S201. A data management module detects a deleting behavior of a terminal, detects that an application module in the terminal invokes an interface in the data management module.

It can be learned from a description in step S101 that when an application in the terminal needs to delete data, a corresponding interface in the data management module needs to be invoked, and the interface includes an interface of a file system, an interface of a Content Provider module, or an interface of a Service module. Therefore, the file system module, the Content Provider module, and the Service module in the data management module can sense a deleting behavior of the terminal. When any one of the three sub-modules in the data management module detects a deleting behavior of the terminal, it may be considered that the terminal performs the deleting operation. Then, the data management module suspends performing the deleting behavior, and performs the following steps.

S202. In response to detecting the deleting behavior of the terminal, the data management module obtains information of the deleting behavior.

A sub-module (the file system module, or the Content Provider module, or the Service module) that is in the data management module and senses the deleting behavior of the terminal acquires the information of the deleting behavior. The information of the deleting behavior includes subject information and object information.

The step may be described with reference to step S102, and details are not described herein again.

S203. The data management module transmits the information of the deleting behavior to the access control module.

The data management module invokes an interface of the access control module and transmits the acquired information of the deleting behavior to the access control module.

S204. The access control module determines, based on the information of the deleting behavior and a preset policy in a policy set, whether to control the deleting behavior.

The step may be described with reference to step S103, and details are not described herein again.

S205. The access control module returns a determining result to the data management module.

S206. The data management module receives the determining result returned by the access control module. If the determining result is that control is not required, the data management module performs step S207. If the determining result is that control is required, the data management module performs step S208.

S207. The data management module deletes a file of target data.

In some examples, if the file system module senses the deleting behavior of the terminal, the file system module receives the determining result returned by the access control module. In this case, the file system module deletes the file of the target data from the storage device.

In some examples, if the Content Provider module senses the deleting behavior of the terminal, the Content Provider module receives the determining result returned by the access control module. In this case, the Content Provider module deletes the file of the target data from the storage device, and deletes metadata information of the file of the target data stored in the SQLite database.

In some examples, if the Service module senses the deleting behavior of the terminal, the Service module receives the determining result returned by the access control module. In this case, the Service module deletes the file of the target data from the storage device.

S208. The data management module moves the file of the target data to a recycle bin.

In some examples, the file system module senses the deleting behavior of the terminal, and the file system module receives the determining result returned by the access control module. In this case, the file system module may stop performing the operation of deleting the target data, and rename the file of the target data. In this way, the application in which the file of the target data is located cannot identify the file of the target data. However, the user may view the renamed file of the target data in a directory at a specified location in the terminal (for example, in a recycle bin of the terminal or a recycle bin of an application in which the target data is located). Optionally, the file system module may first back up the target data to a directory at a specified location and then perform an operation of deleting the target data. In this way, the user may also view and operate the target data in the directory at the specified location, to protect the target data. This is not limited in this embodiment of this application.

In some examples, if the Content Provider module senses the deleting behavior of the terminal, the Content Provider module receives the determining result returned by the access control module. In this case, the content provider module stops performing an operation of deleting the target data, and renames the file of the target data. For example, renaming the file name and an extension name is included, so that an application in which the file of the target data is located cannot identify the file of the target data. In this way, the application in which the file of the target data is located cannot recognize the file of the target data. However, the user may view the renamed file of the target data in a directory at a specified location in the terminal. Optionally, the Content Provider module may first back up the target data to a directory at a specified location and then perform an operation of deleting the target data. In this way, the user may also view and operate the target data in the directory at the specified location, to protect the target data. This is not limited in this embodiment of this application.

In some examples, the Service module senses the deleting behavior of the terminal, the Service module receives the determining result returned by the access control module. In this case, the Service module stops performing an operation of deleting the target data, and renames the file of the target data. For example, renaming the file name and an extension name is included, so that an application in which the file of the target data is located cannot identify the file of the target data. In this way, the application in which the file of the target data is located cannot identify the file of the target data. However, the user may view the renamed file of the target data in a directory at a specified location in the terminal. Optionally, the Service module may first back up the target data to a directory at a specified location, and then perform an operation of deleting the target data. In this way, the user may also view and operate the target data in the directory at the specified location, to protect the target data. This is not limited in this embodiment of this application.

In some other examples, after step S208, the user may view the renamed file of the target data by using an interface provided by the recycle bin. The user can also restore, in the original application, the renamed file of the target data to a visible state by using the interface provided by the recycle bin. The user may also delete the renamed file of the target data from the recycle bin by using the interface provided by the recycle bin. This is not limited in this embodiment of this application.

It should further be noted that the control policy in the policy set may be set by the terminal by default, or may be set by the user, or may be pushed by the cloud server. Updating of the control policy may also be reset by the user, or pushed by the cloud server.

Figure 5B:
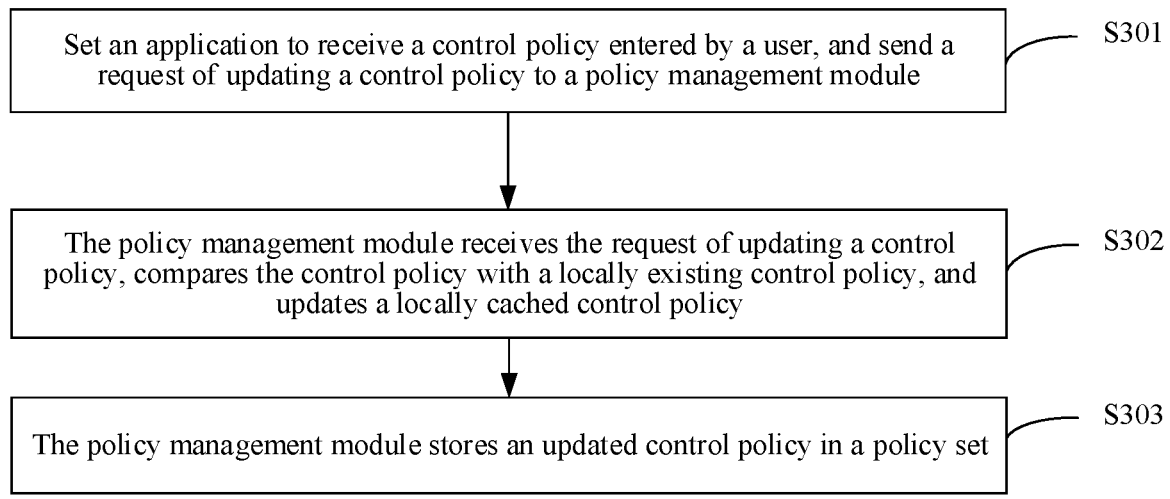
FIG. 5B is a schematic flowchart 3 of a method for protecting application data according to an embodiment of this application.

FIG. 5B is a schematic flowchart of updating a control policy by a user, and the procedure includes the following steps:

S301. Set an application to receive a control policy entered by a user, and send a request of updating a control policy to a policy management module.

S302. The policy management module receives the request of updating a control policy, compares the control policy with a locally existing control policy, and updates a locally cached control policy.

S303. The policy management module stores an updated control policy in a policy set.

Figure 5C:
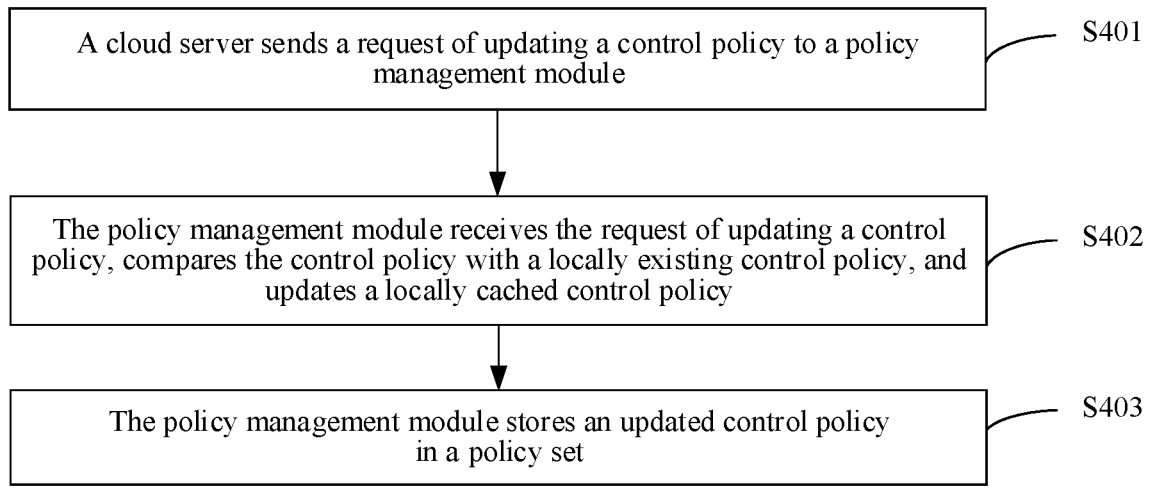
FIG. 5C is a schematic flowchart 4 of a method for protecting application data according to an embodiment of this application.

FIG. 5C is a schematic flowchart of updating a control policy by a cloud server, and the procedure includes the following steps:

S401. The cloud server sends a request of updating a control policy to a policy management module.

S402. The policy management module receives the request of updating a control policy, compares the control policy with a locally existing control policy, and updates a locally cached control policy.

S403. The policy management module stores an updated control policy in a policy set.

Therefore, this application provides two manners for updating a control policy, which may be set based on a requirement of a user, or automatically pushed by a cloud server based on usage of an application, thereby improving user experience.

With reference to an actual usage scene, an example is used to describe an implementation process of the method provided in this embodiment of this application.

It is assumed that the control policy in the terminal is: 1. Applications that need to be controlled in the subject control policy include: a "Baidu Music" application, a "KuGou Music" application, "XiaMi Music" application, and a "QQ Music" application; a type of an application that needs to be controlled is: a third-party application; and statuses of applications that need to be controlled include that both a foreground-running application and a background-running application need to be controlled. 2. Files of target data that needs to be controlled in the object control policy include: a file with a file location of /sdcard/Music/; a file with a file type of mp3, wma, mid, ra, or ogg; a file size: unlimited; and file creation time: unlimited.

It is assumed that terminal detects the "QQ Music" application is invoking the interface of the Content Provider module, and requests to delete a file of "/sdcard/Music/123.mp3". In this case, the Content Provider module suspends the deleting operation and transmits subject information (the "QQ Music" application) and object information (an audio file: /sdcard/Music/123.mp3) of the deleting behavior to the access control module. The access control module reads a control policy from the policy set. The access control module compares the subject information and the object information of the deleting behavior with the control policy, to determine whether to control the deleting behavior.

A subject of the deleting behavior (the "QQ Music" application) is an application in the subject control policy, and is also an application type that needs to be controlled. An object (the audio file: the/sdcard/Music/123.mp3) location of the deleting behavior is within a range of a file location that needs to be controlled in the object control policy, and the object is also a file type that needs to be controlled in the object control policy. Therefore, the deleting behavior needs to be controlled. It should be noted that either the subject information or the object information of the deleting behavior conforms to a case in the control policy, the deleting behavior needs to be controlled.

In this case, the Content Provider module stops deleting the audio file (/sdcard/Music/123. mp3) and renames the audio file (/sdcard/Music/123.mp3) to "/sdcard/Music/.abc._3pm_", and stores correspondence between the file of "/sdcard/Music/123.mp3" and the file of "/sdcard/Music/.abc._3pm_" in a database of the recycle bin.

Currently, the file of "/sdcard/Music/123.mp3" cannot be viewed in the "QQ Music" application, and the file of "/sdcard/Music/.abc._3pm_" can be viewed in the recycle bin.

In the recycle bin, when the terminal displays the file "/sdcard/Music/. abc._3pm_", the terminal may display an original name of the file "/sdcard/Music/. abc._3pm_", that is, "/sdcard/Music/123.mp3". In this case, the user may view the file in the recycle bin, and know that the file is the originally deleted file.

If the user needs to restore the audio file (/sdcard/Music/123.mp3) to the "QQ Music" application, the user may perform an operation in the recycle bin. The recycle bin renames, based on the correspondence between the "/sdcard/Music/123.mp3" and the "/sdcard/Music/. abc._3pm_", the file of "/sdcard/Music/. abc._3pm_" to the file of "/sdcard/Music/123.mp3", to enable that the file of "/sdcard/Music/123.mp3" may be viewed in the "QQ Music" application.

Figure 6A:
FIG. 6A is a schematic diagram 1 of an example of a terminal interface according to an embodiment of this application.
Figure 6B:
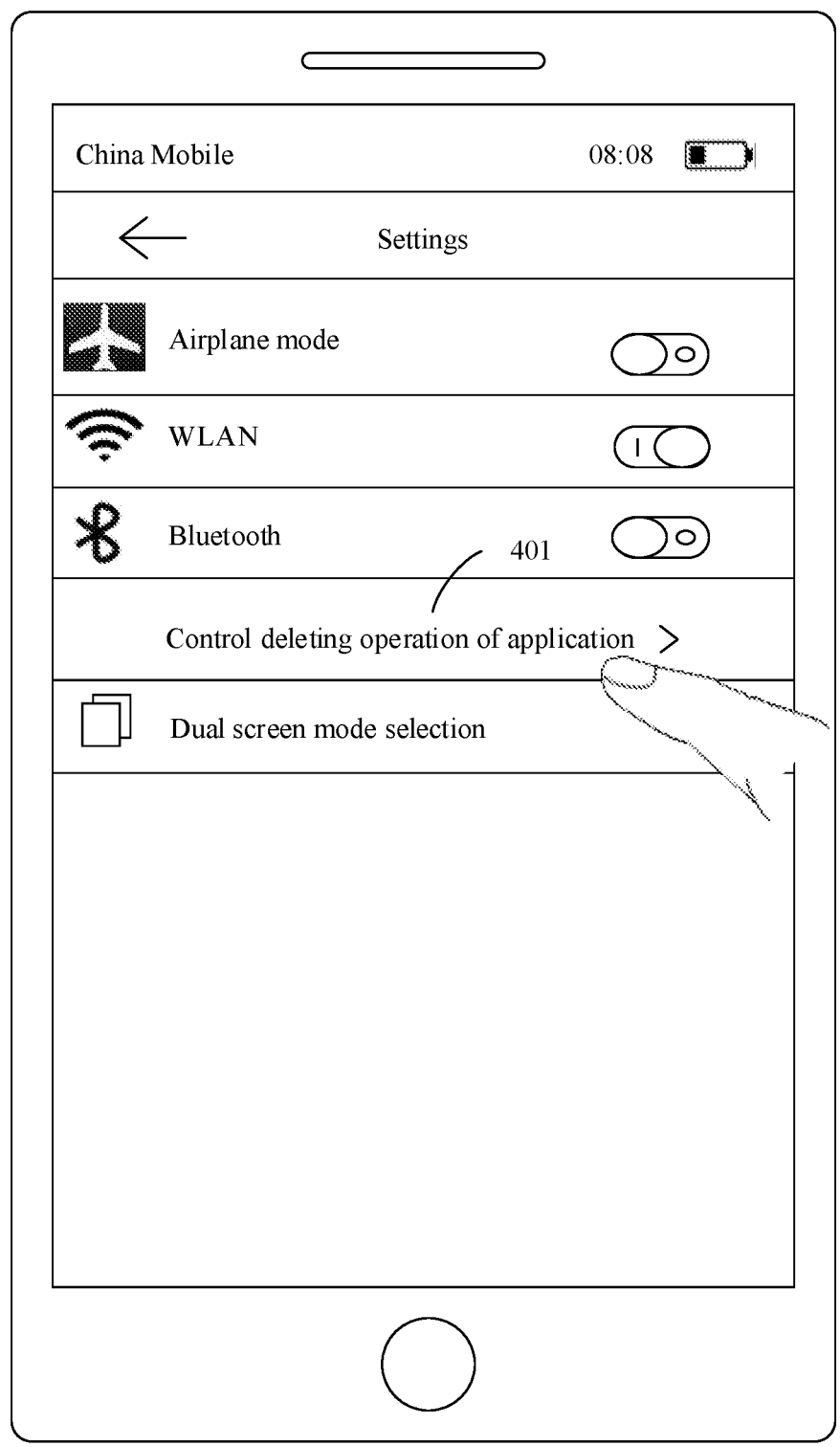
FIG. 6B is a schematic diagram 2 of an example of a terminal interface according to an embodiment of this application.
Figure 6C:
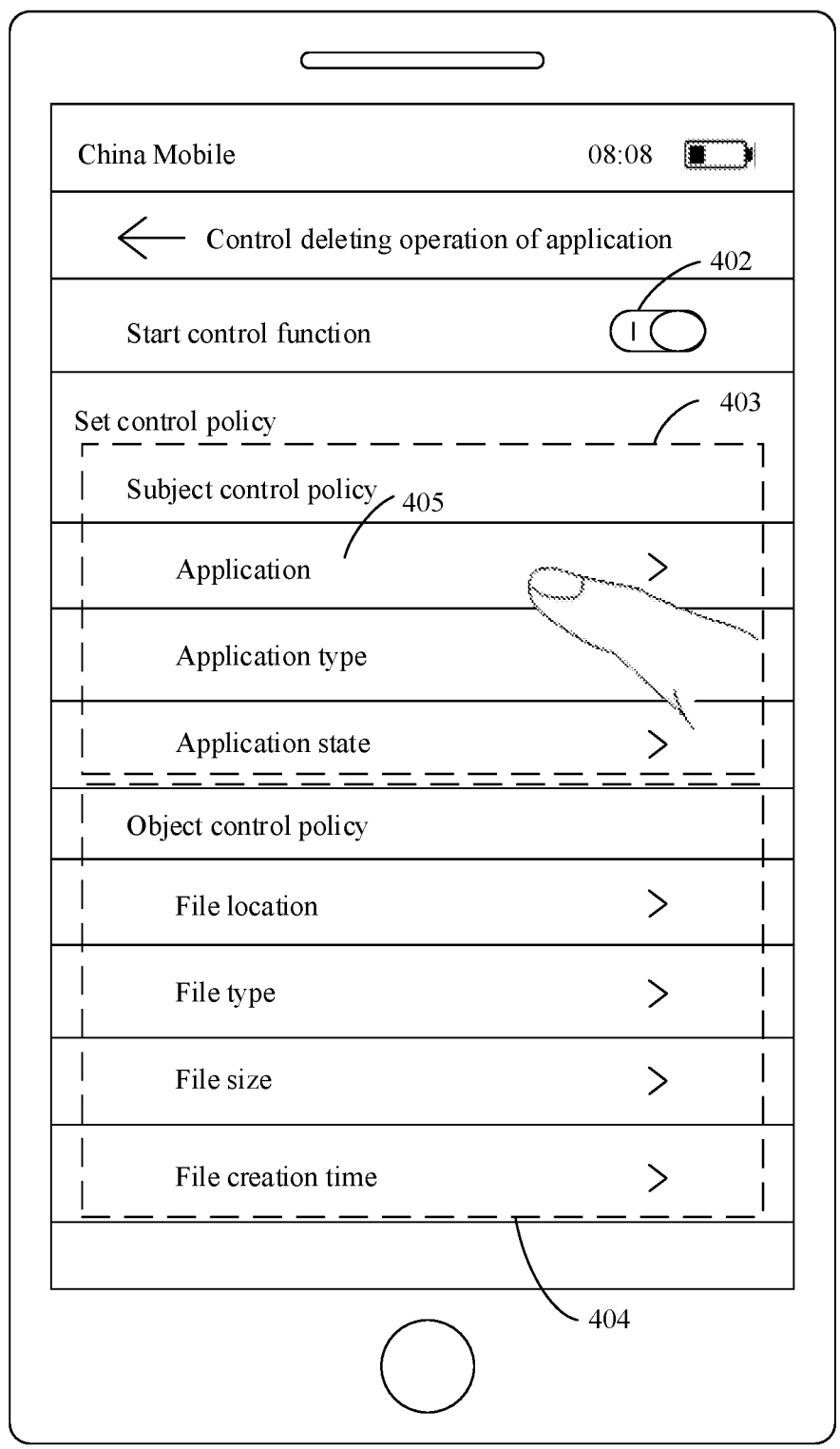
FIG. 6C is a schematic diagram 3 of an example of a terminal interface according to an embodiment of this application.

The technical solution provided in this embodiment of this application may be applied to a process in which an application deletes data in the application. Referring to FIG. 6A to FIG. 6P, the following describes the technical solution provided in this embodiment of this application with reference to an interface of the terminal by using an example in which an audio file "123" is deleted from "QQ music".

First, a control policy of the terminal is set. User settings are described herein as an example.

FIG. 6A shows a main screen interface of the terminal, and the user may tap a "Settings" application in the interface to open a main interface of the "Settings" application. FIG. 6b shows a main interface of the "Settings" application, and the main interface includes an option menu 401 of "Control deleting operation of application". The user can enter a setting interface of "Managing deleting operation of application" by tapping the option menu 401. As shown in FIG. 6C, the setting interface of "Managing deleting operation of application" includes an open button 402 of "Start control function", a setting item 403 of "Subject control policy", and a setting item 404 of "Object control policy". The setting item 403 of the "Subject control policy" includes a setting item of an "Application", a setting item of an "Application type", and a setting item of an "Application state". The setting item 404 of the "Object control policy" include a setting item of a "File location", a setting item of a "File type", a setting item of a "File size", and a setting item of "File creation time". It should be noted that specific setting items of the control policies are merely examples, and a specific setting of the control policy is not limited in this embodiment of this application.

Figure 6D:
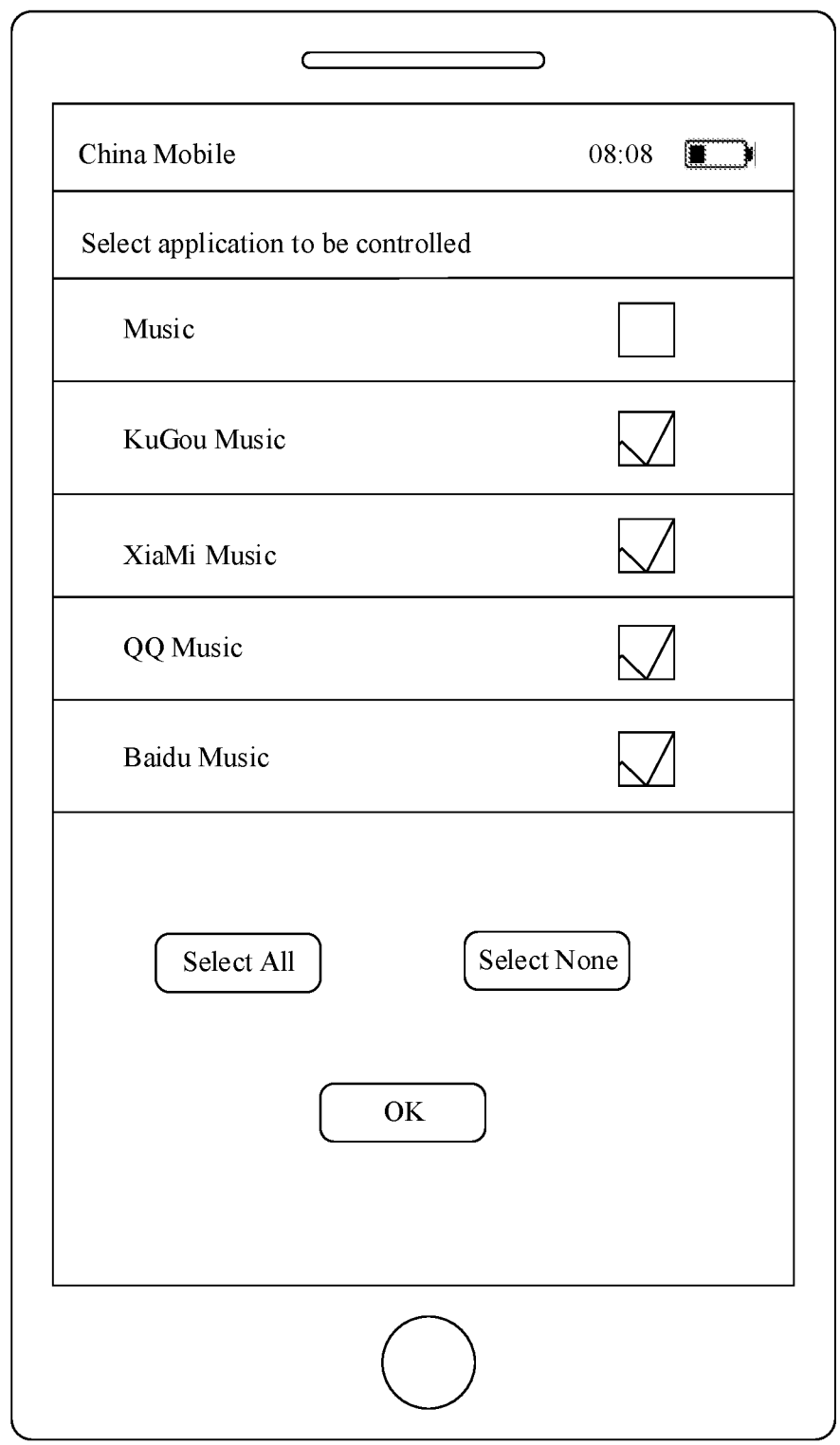
FIG. 6D is a schematic diagram 4 of an example of a terminal interface according to an embodiment of this application.

As shown in FIG. 6C, the user taps a setting item 405 of an "Application" in the "Subject control policy" to enter an interface shown in FIG. 6D. The interface may be used by the user to select an application that needs to be controlled. For example, in this embodiment, "KuGou Music", "XiaMi Music", "QQ Music", and "Baidu Music" are selected, indicating that the terminal needs to control the applications. "Music" is an application built in a terminal system, and is not selected in this embodiment, indicating that the terminal does not need to control the application. To facilitate a user operation, this interface further includes function buttons of "Select All", "Select None", and "OK". It should be noted that a specific form of a function button included in the interface and a specific form of the interface are not limited in this embodiment of this application.

Figure 6E:
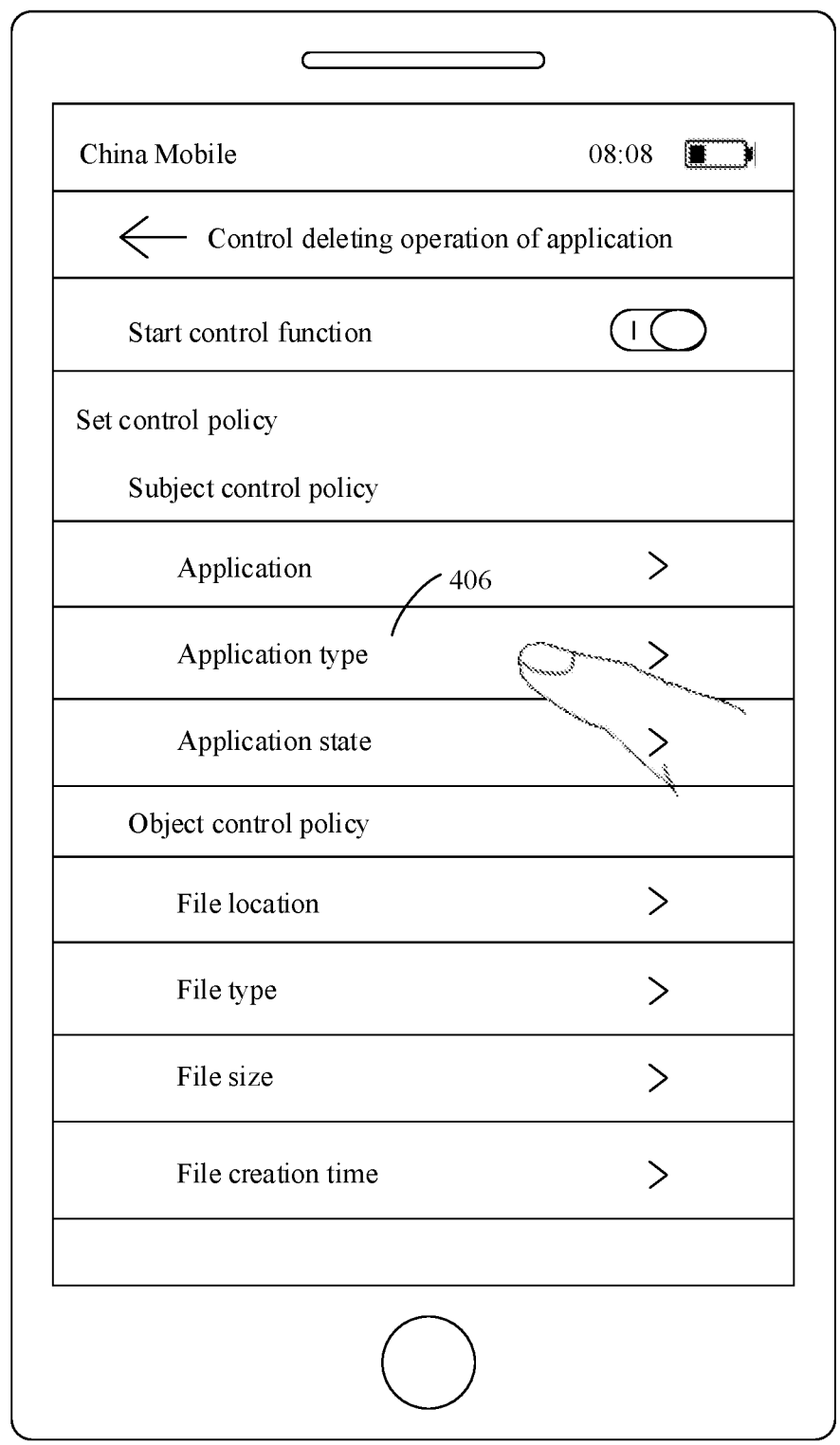
FIG. 6E is a schematic diagram 5 of an example of a terminal interface according to an embodiment of this application.
Figure 6F:
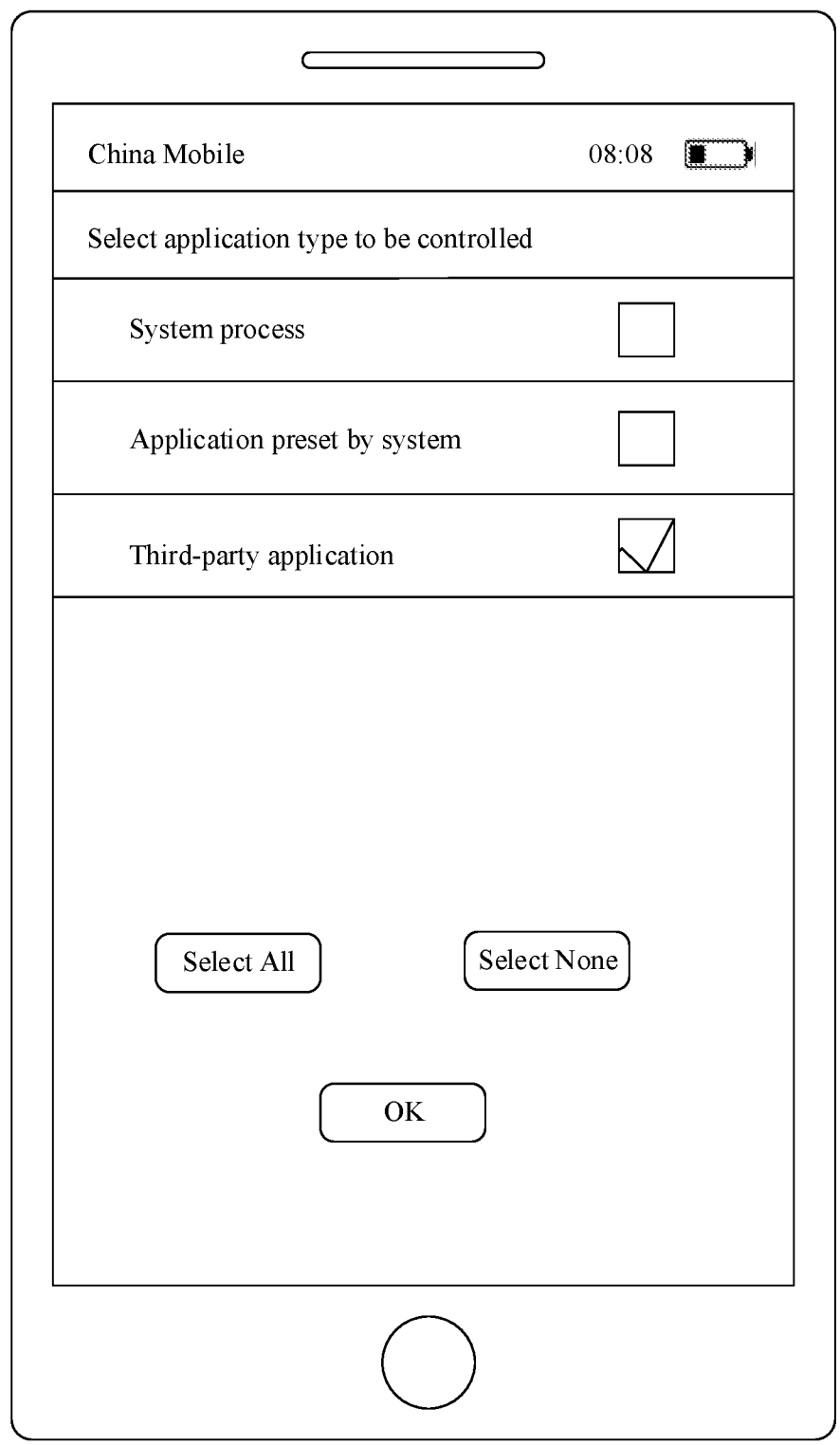
FIG. 6F is a schematic diagram 6 of an example of a terminal interface according to an embodiment of this application.

As shown in FIG. 6E, the user taps a setting item 406 of an "Application type" in the "Subject control policy" to enter an interface shown in FIG. 6F. The interface may be used by the user to select an application type that needs to be controlled. For example, in this embodiment, a "Third-party application" is selected, indicating that the terminal needs to control applications of the types. A "System process" and an "Application preset by system" are not selected, indicating that the terminal does not need to control applications of the types. To facilitate a user operation, this interface further includes function buttons of "Select All", "Select None", and "OK". A specific form of a function button included in the interface and a specific form of the interface are not limited in this embodiment of this application.

It should be noted that for another control policy setting interface in the control policy, reference may be made to descriptions of the foregoing two interfaces. Details are not described herein again.

Then, by using an example in which the user deletes an audio file in the "QQ Music", a process in which the terminal controls file deletion by the user is described.

Figure 6G:
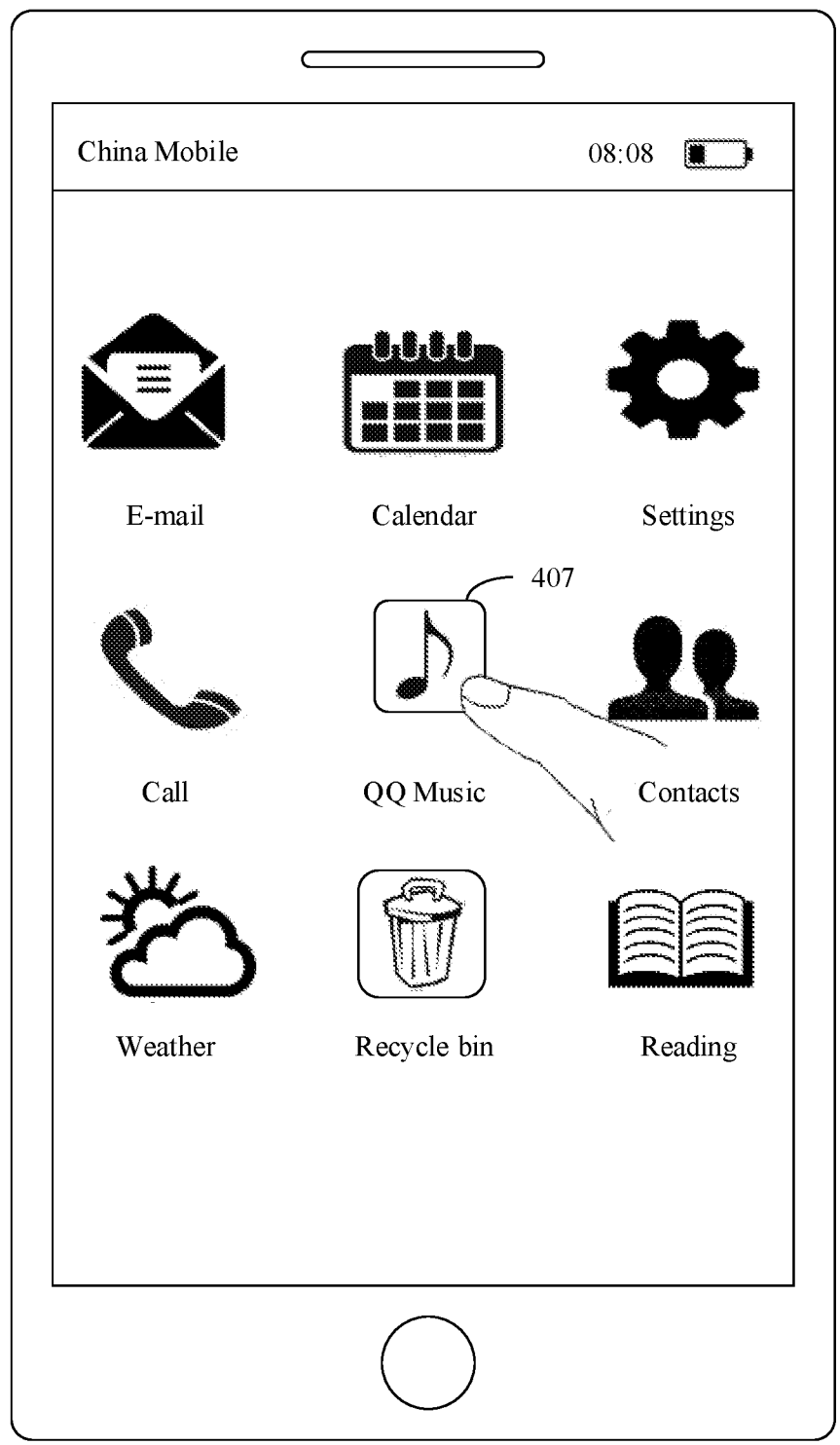
FIG. 6G is a schematic diagram 7 of an example of a terminal interface according to an embodiment of this application.
Figure 6H:
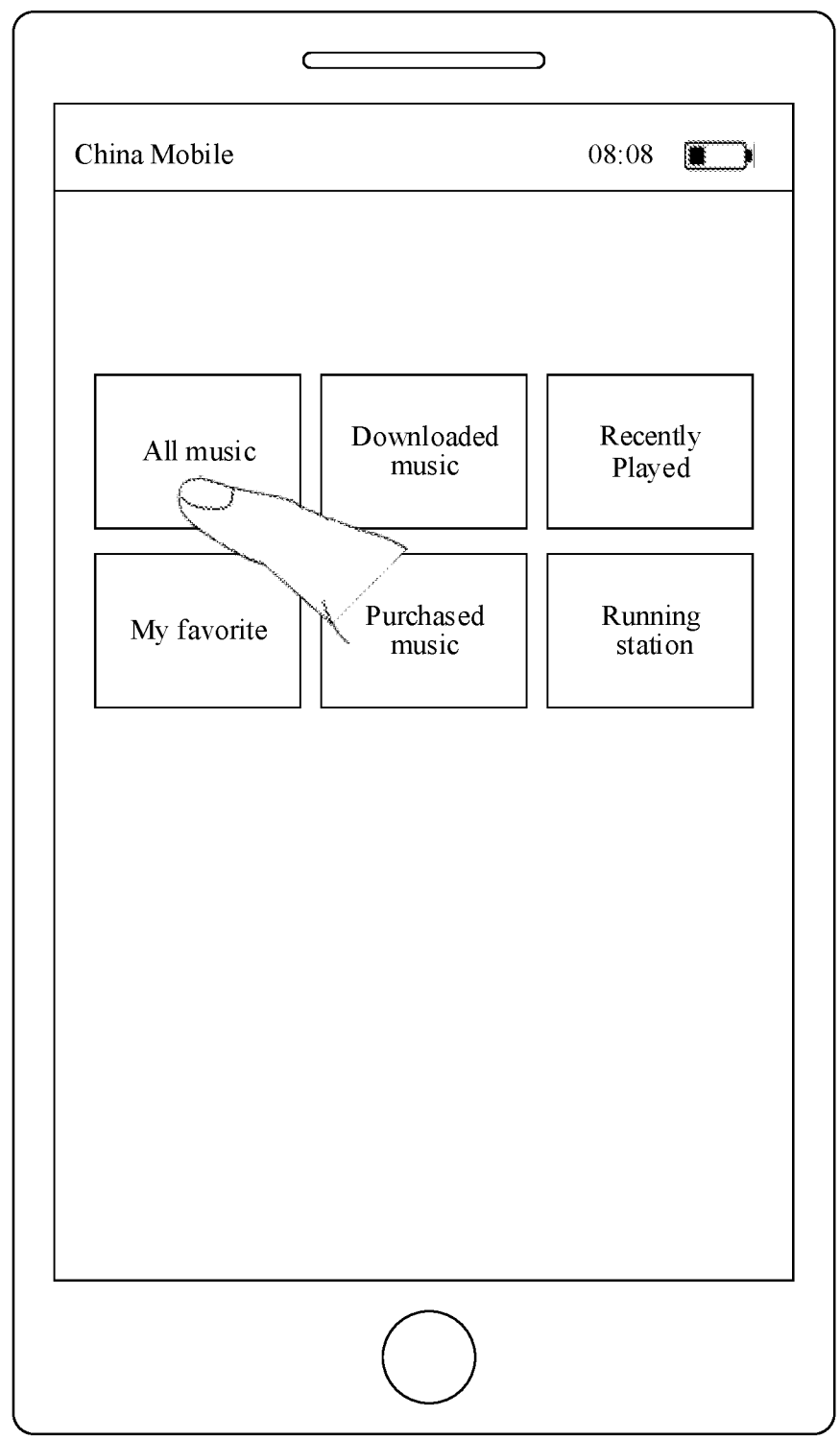
FIG. 6H is a schematic diagram 8 of an example of a terminal interface according to an embodiment of this application.
Figure 6I:
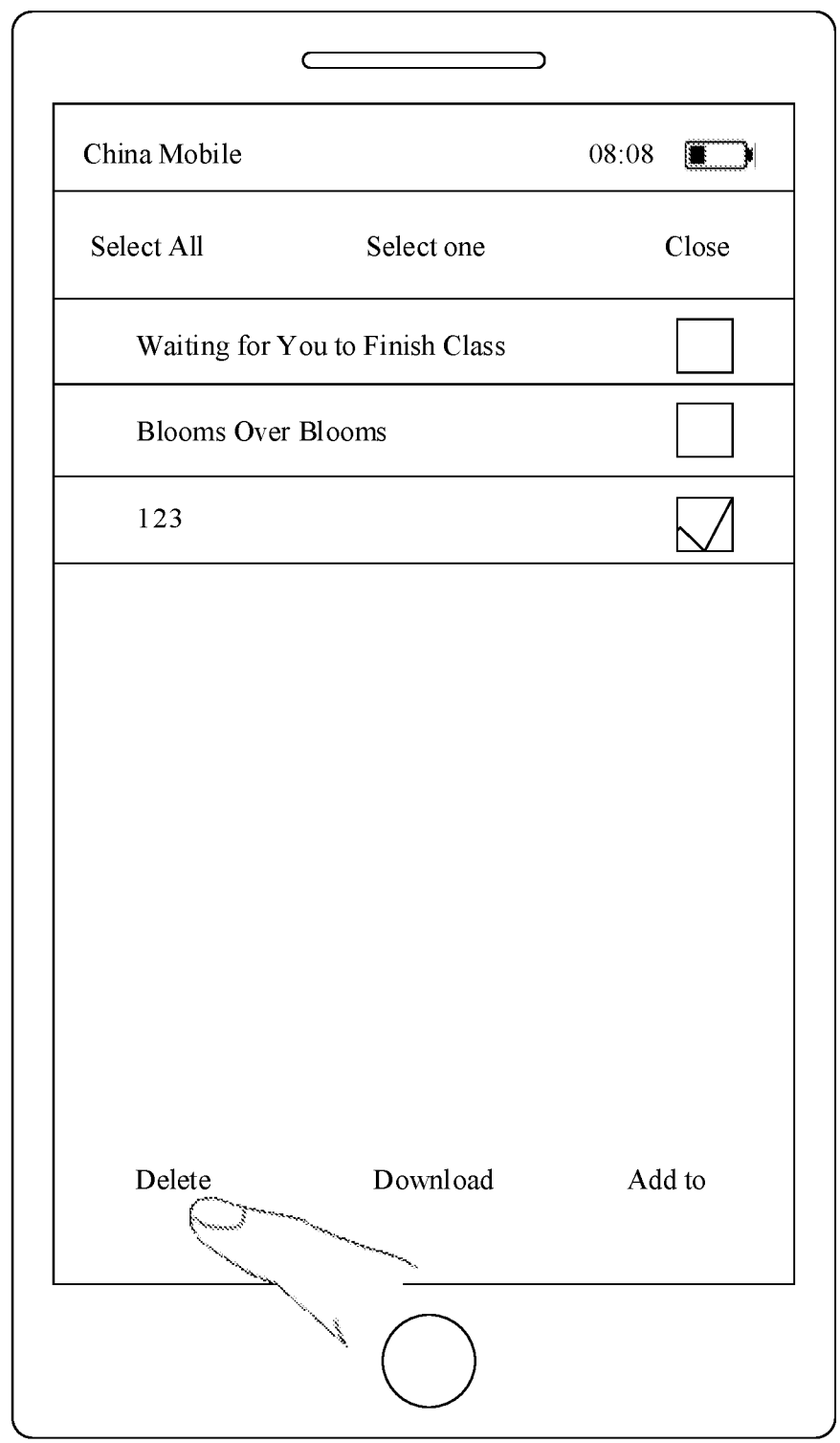
FIG. 6I is a schematic diagram 9 of an example of a terminal interface according to an embodiment of this application.
Figure 6J:
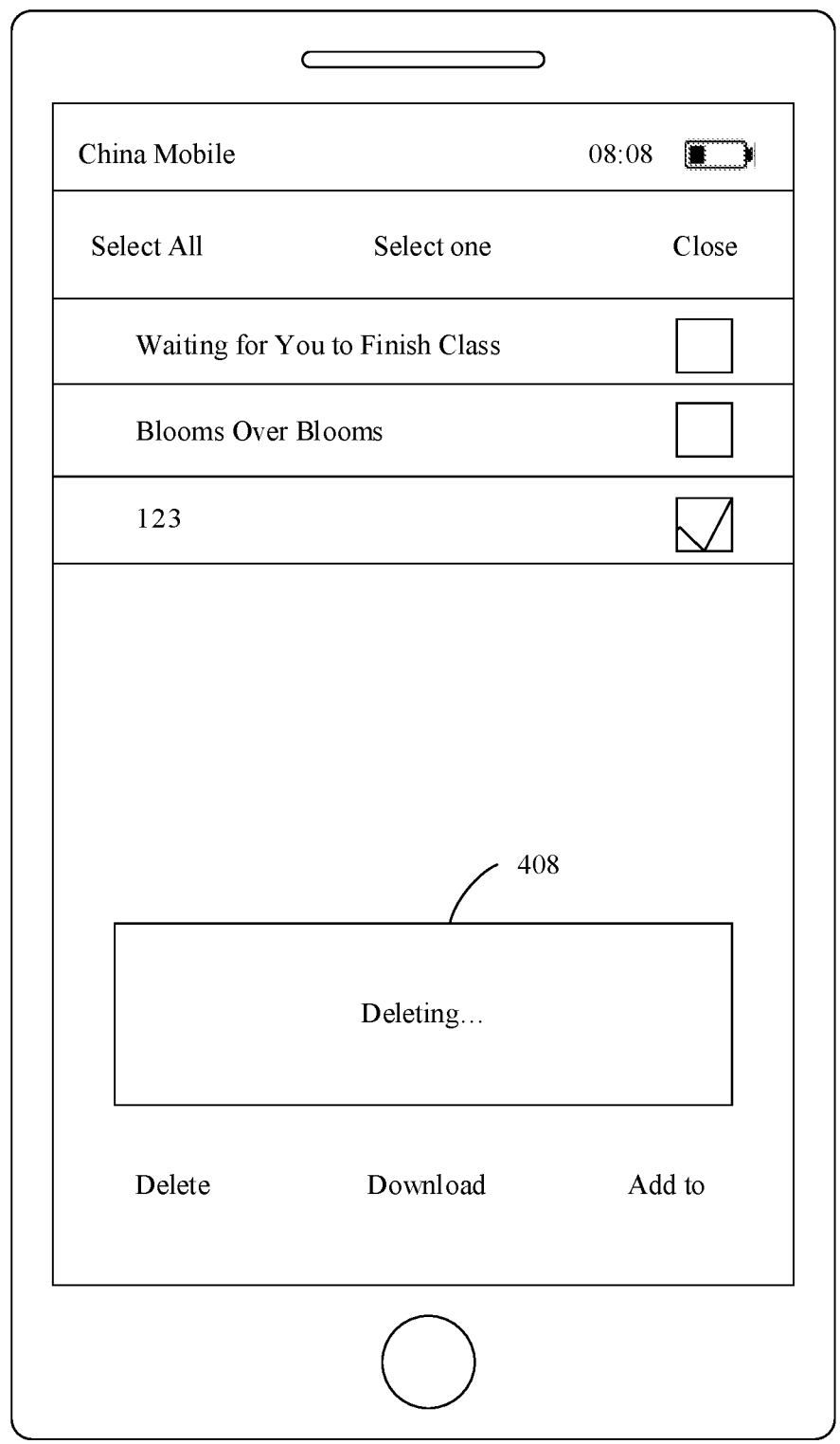
FIG. 6J is a schematic diagram 10 of an example of a terminal interface according to an embodiment of this application.

FIG. 6G shows the main screen interface of the terminal. The user taps an application icon 407 of the "QQ Music" to enter a main interface of the "QQ Music" application. As shown in FIG. 6H, the user taps "All Music" to view all audio files in the "QQ Music". FIG. 6I shows all audio files included in the "QQ Music". The user may select an audio file "123" and tap a "Delete" button. As shown in FIG. 6J, the terminal performs an operation of deleting the audio file "123". The process includes that the terminal determines that whether the deleting operation is a behavior that needs to be controlled. In this example, the terminal determines that the deleting operation is a behavior that needs to be controlled, and therefore moves the audio file to the "Recycle bin". In this case, the terminal displays an interface shown in FIG. 6K. For a detailed process, reference may be made to a description of the foregoing example, and details are not described herein again.

Figure 6K:
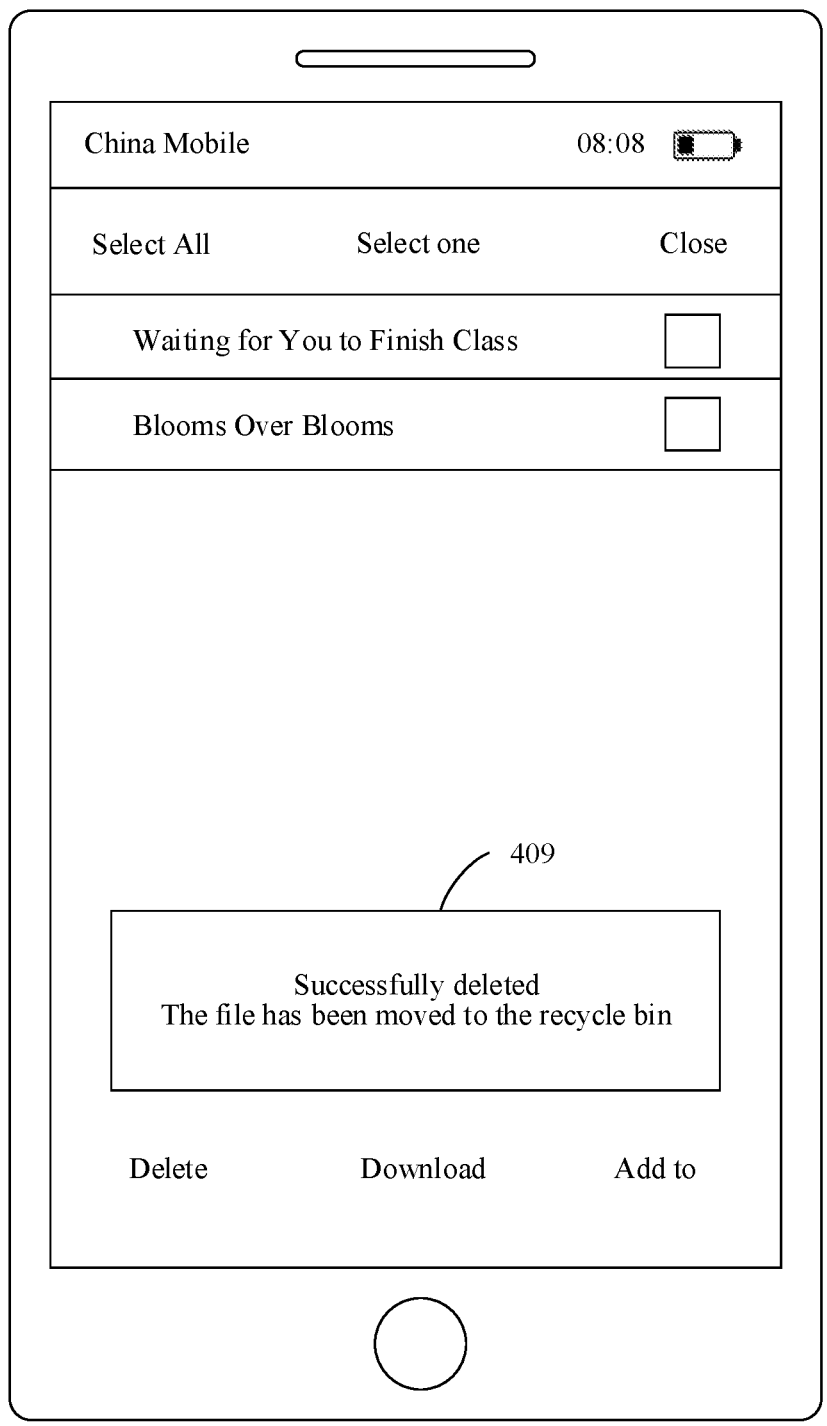
FIG. 6K is a schematic diagram 11 of an example of a terminal interface according to an embodiment of this application.

It should be noted that, as shown in FIG. 6K, in the interface of the "QQ Music", the user cannot see the audio of "123". For the user, it may be considered that the audio file has been deleted.

Then, in some examples, the user may view or even restore, by using an application in the "Recycle bin", a file deleted from the "QQ Music".

Figure 6L:
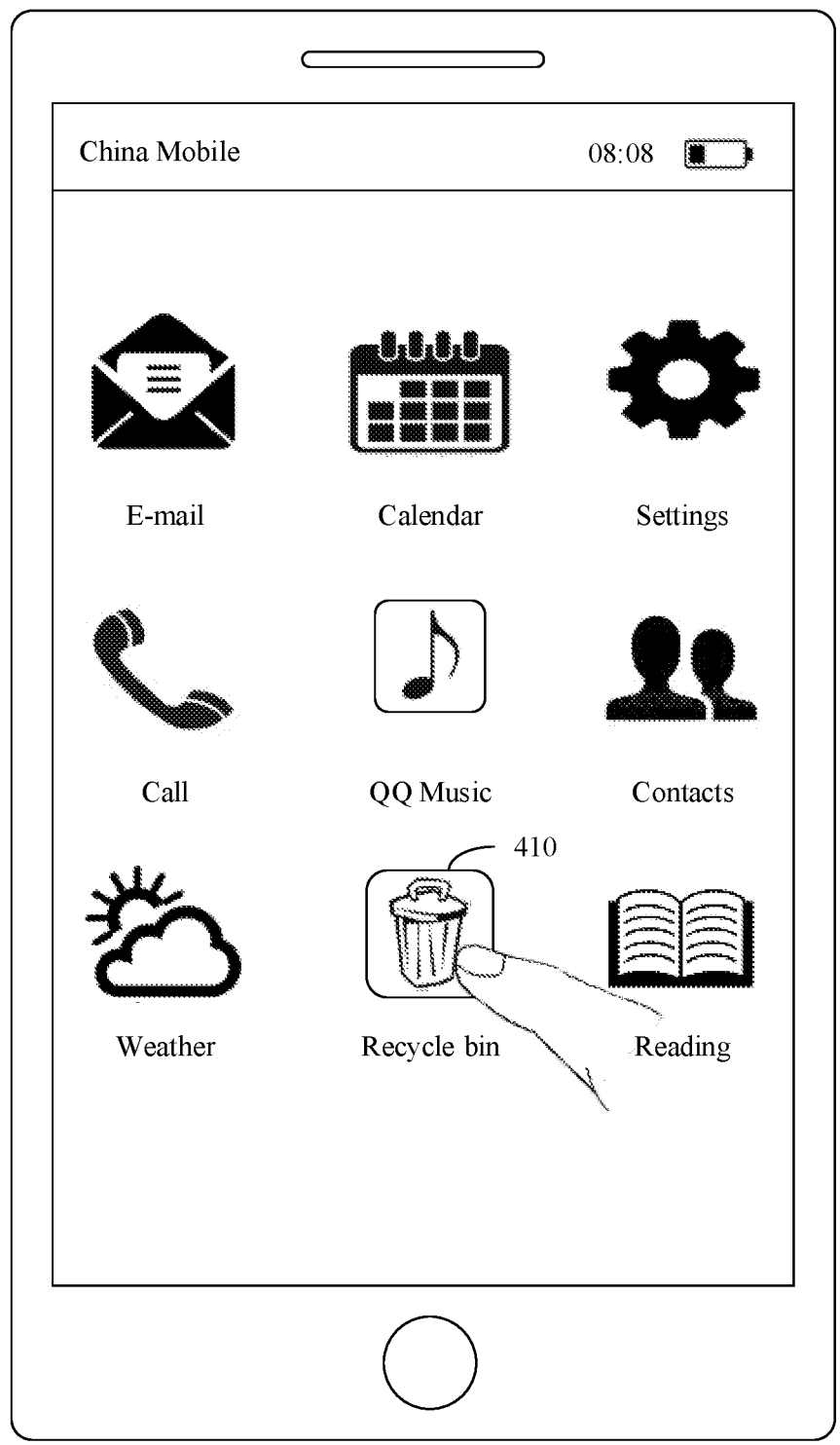
FIG. 6L is a schematic diagram 12 of an example of a terminal interface according to an embodiment of this application.
Figure 6M:
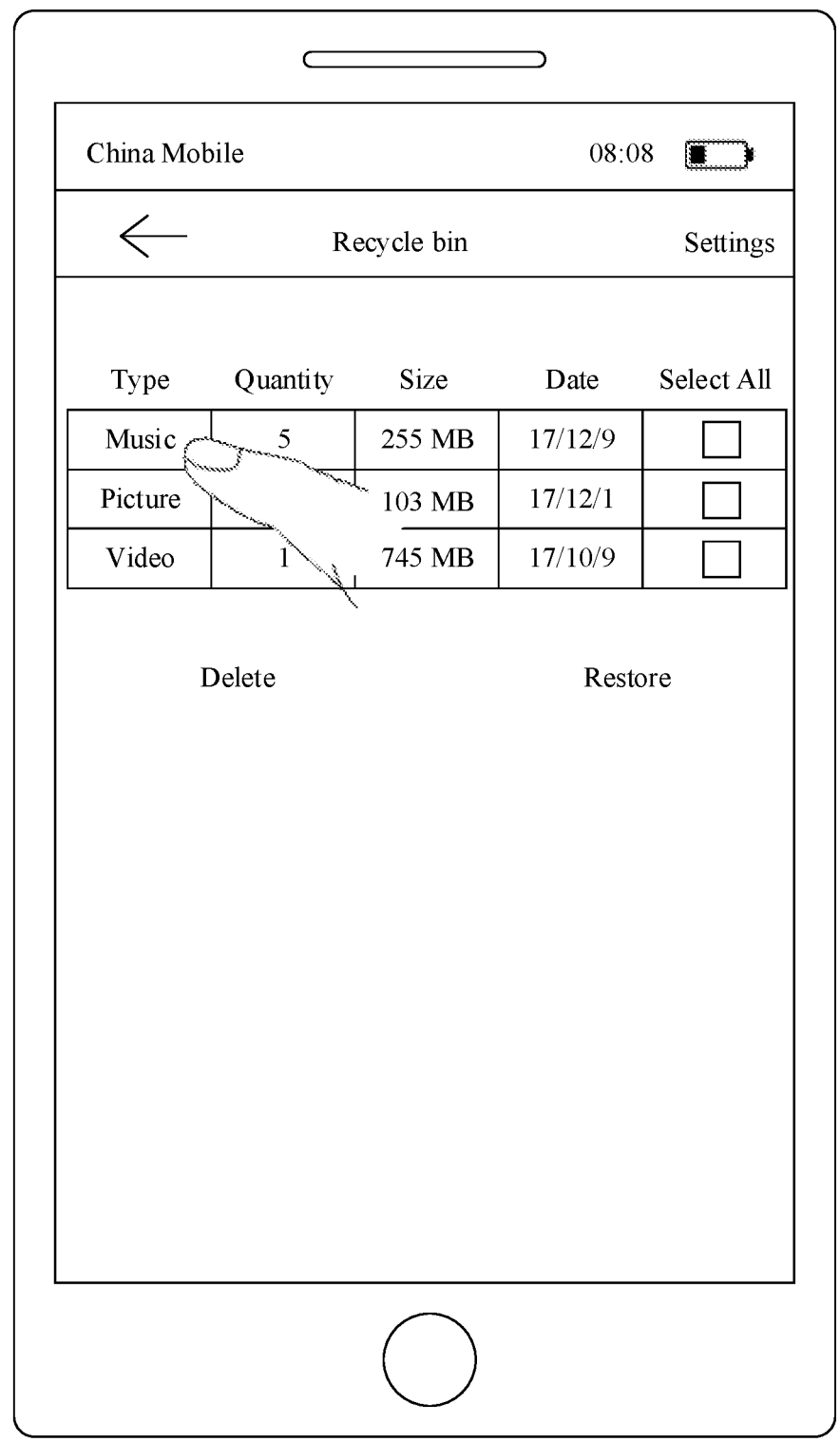
FIG. 6M is a schematic diagram 13 of an example of a terminal interface according to an embodiment of this application.

FIG. 6L shows the main screen interface of the terminal. The user may tap an application icon 410 of the "Recycle bin" to enter a main interface of the "Recycle bin" application. FIG. 6M shows the main interface of the "Recycle bin" application. Files deleted by some applications in the terminal may be viewed by using the interface. The files are files that are deleted by deleting operations that the terminal determines need to be controlled. The user may view types, quantities, sizes, deletion time, and the like of the deleted files. For example, the user taps "Music" in the interface, and the terminal enters an interface shown in FIG. 6N, where detailed information about a deleted audio file is displayed in the interface.

Figure 6N:
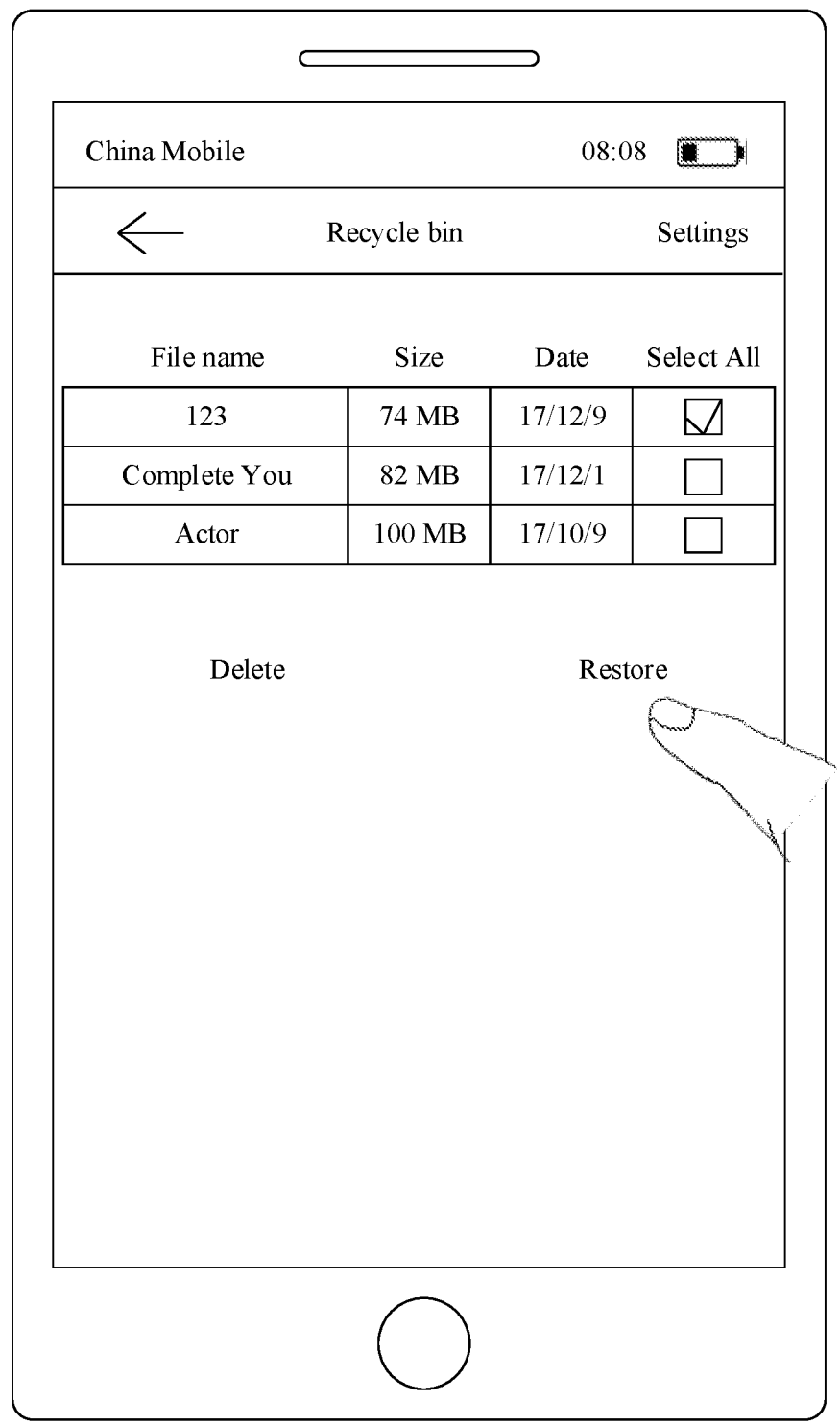
FIG. 6N is a schematic diagram 14 of an example of a terminal interface according to an embodiment of this application.
Figure 6O:
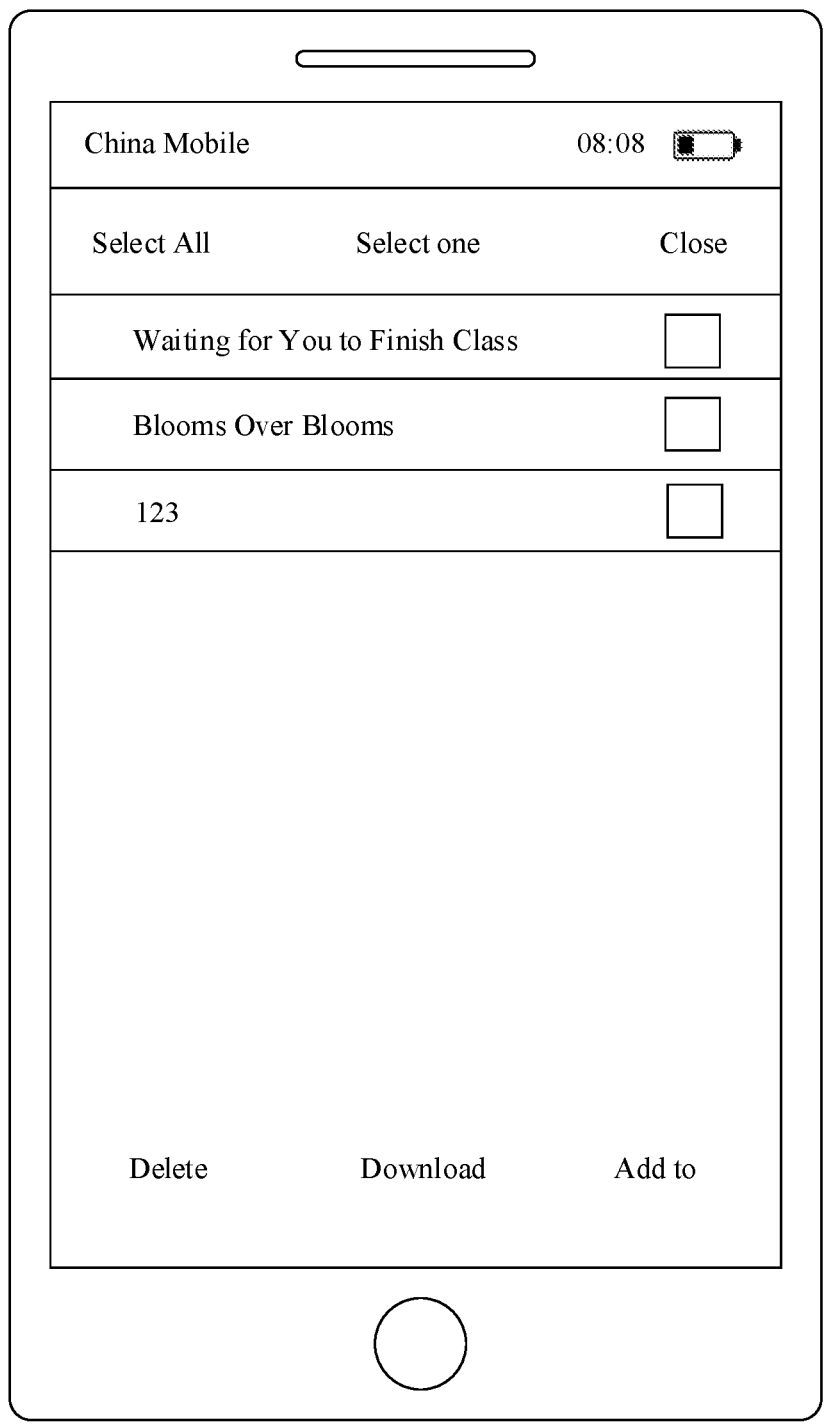
FIG. 6O is a schematic diagram 15 of an example of a terminal interface according to an embodiment of this application.
Figure 6P:
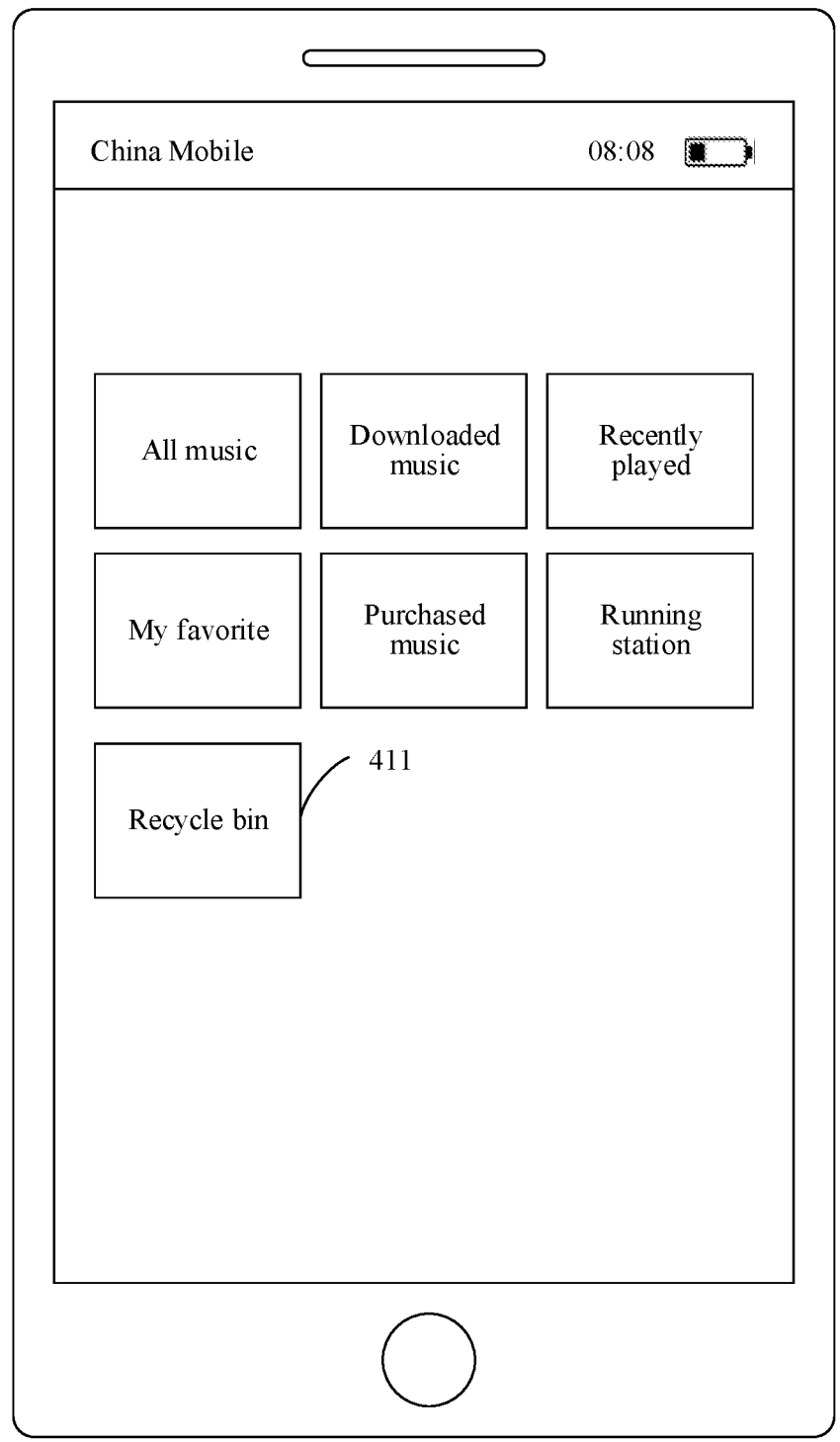
FIG. 6P is a schematic diagram 16 of an example of a terminal interface according to an embodiment of this application.

In the interface shown in FIG. 6N, the user selects the audio file "123" and taps the "Delete" button, and the "Recycle bin" deletes the audio file. Alternatively, the user may select the audio file "123" in the interface shown in FIG. 6N, and tap a "Restore" button, so that the terminal may restore the audio file to the "QQ Music" application. As shown in FIG. 6O, the user enters the "QQ Music" application again, and may view the audio file "123".

In some other examples, the user may also view or even restore, by using a "Recycle bin" in the "QQ Music", a file deleted from the "QQ Music".

FIG. 6P shows a main interface of the "QQ Music" application, and the main interface includes a function module 411 of the "Recycle bin". The user may view, by using the function module 411 of the "Recycle bin", an audio file deleted from the "QQ Music". For an interface and a function of the function module, reference may be made to the foregoing "Recycle bin" application. Details are not described herein again.

It may be understood that, each terminal interface in FIG. 6A to FIG. 6P may be an independent interface, there may be no relationship between diagrams in FIG. 6A to FIG. 6P, and each terminal interface in FIG. 6A to FIG. 6P is an independent embodiment schematic diagram.

The technical solution provided in this embodiment of this application may be applied to a process in which an application deletes data in another application. Referring to FIG. 7A to FIG. 7I, the following describes the technical solution provided in this embodiment of this application with reference to the interface of the terminal by using an example in which a "Mobile phone manager" deletes a file of a "Photo 1" in a "Gallery".

For setting of the control policy of the terminal, reference may be made to the foregoing description. Details are not described herein again. It is assumed that the "Mobile phone manager" application is set as an application that needs to be controlled.

Figure 7A:
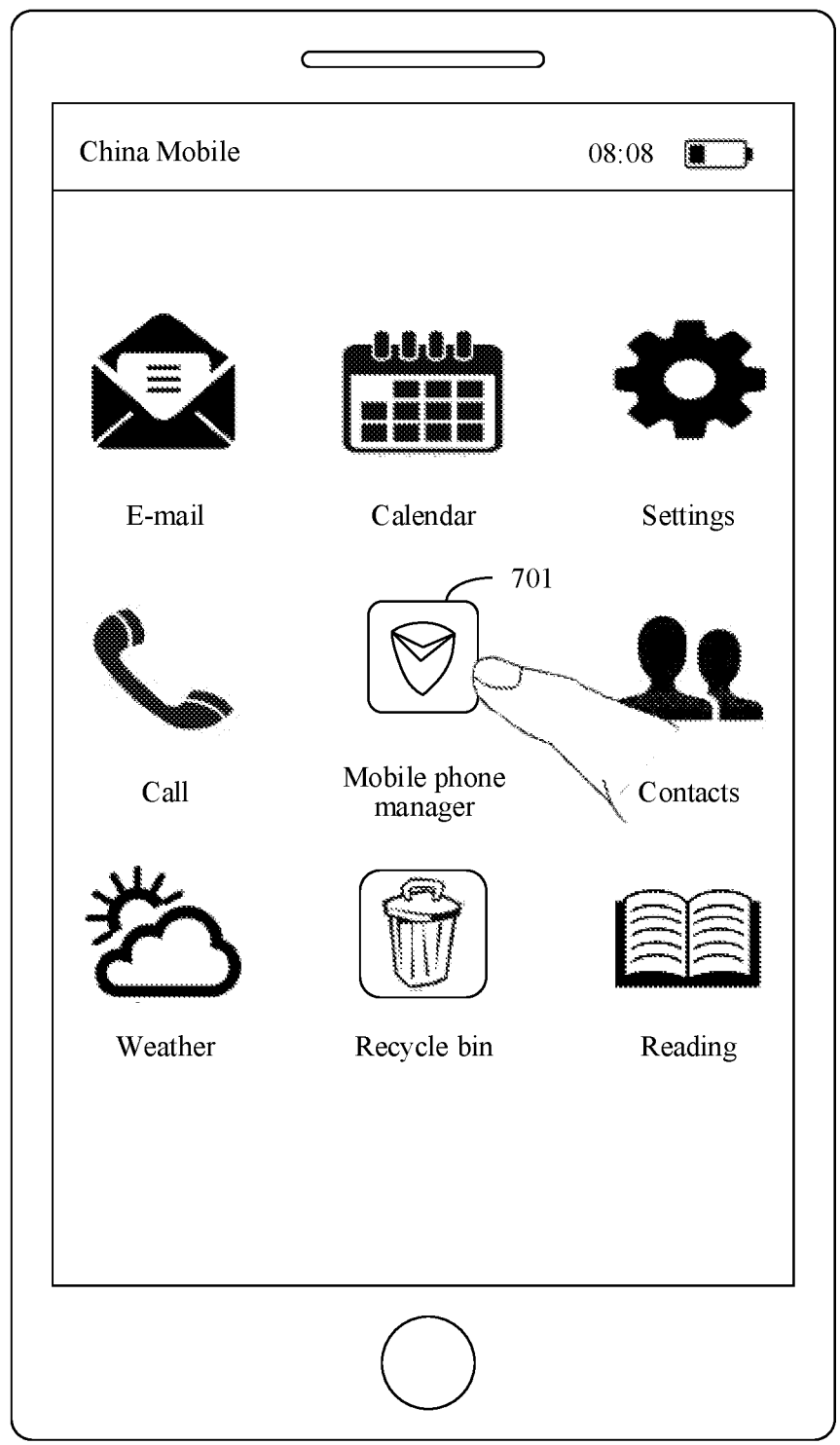
FIG. 7A is a schematic diagram 17 of an example of a terminal interface according to an embodiment of this application.
Figure 7B:
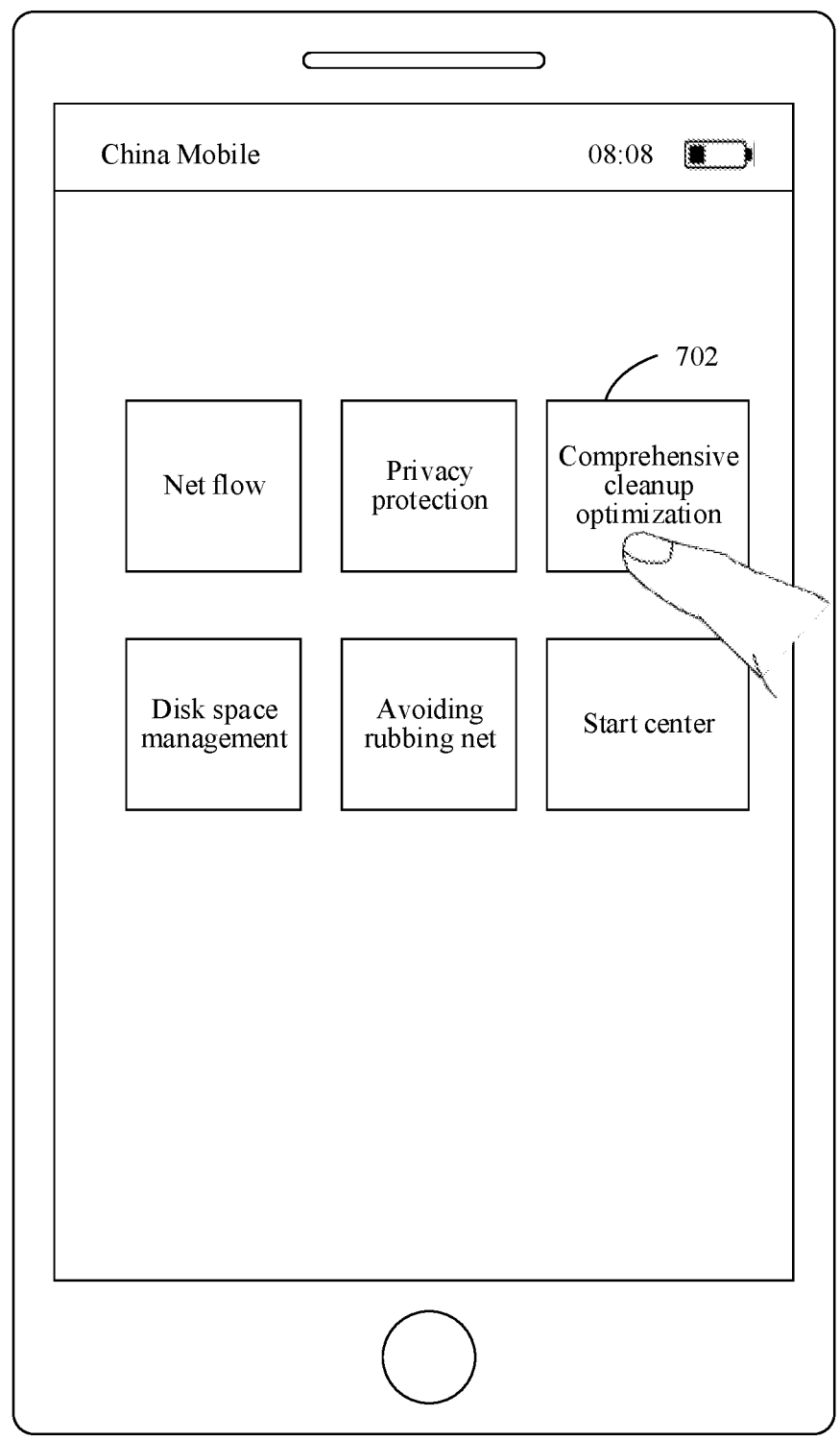
FIG. 7B is a schematic diagram 18 of an example of a terminal interface according to an embodiment of this application.
Figure 7C:
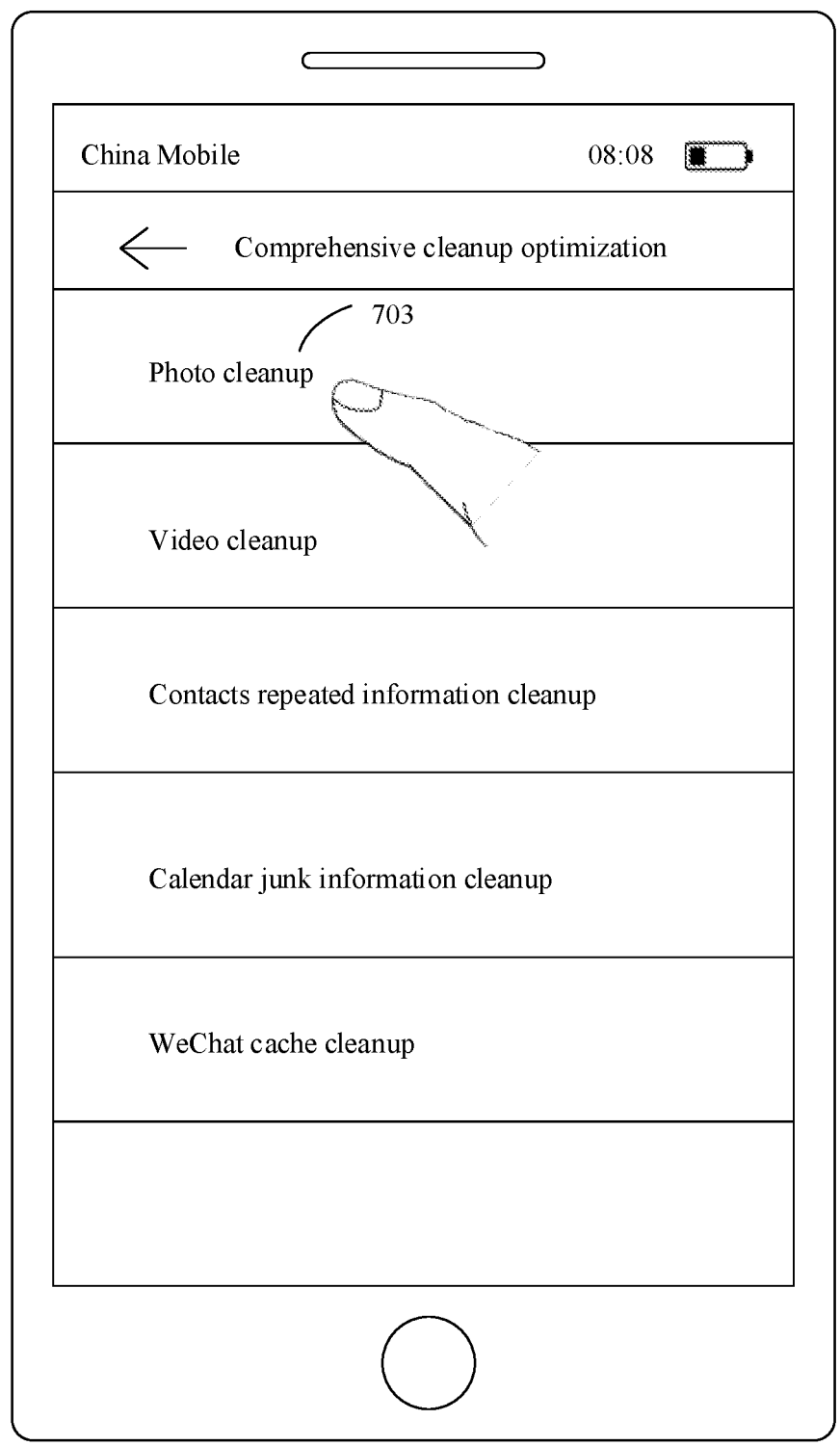
FIG. 7C is a schematic diagram 19 of an example of a terminal interface according to an embodiment of this application.
Figure 7D:
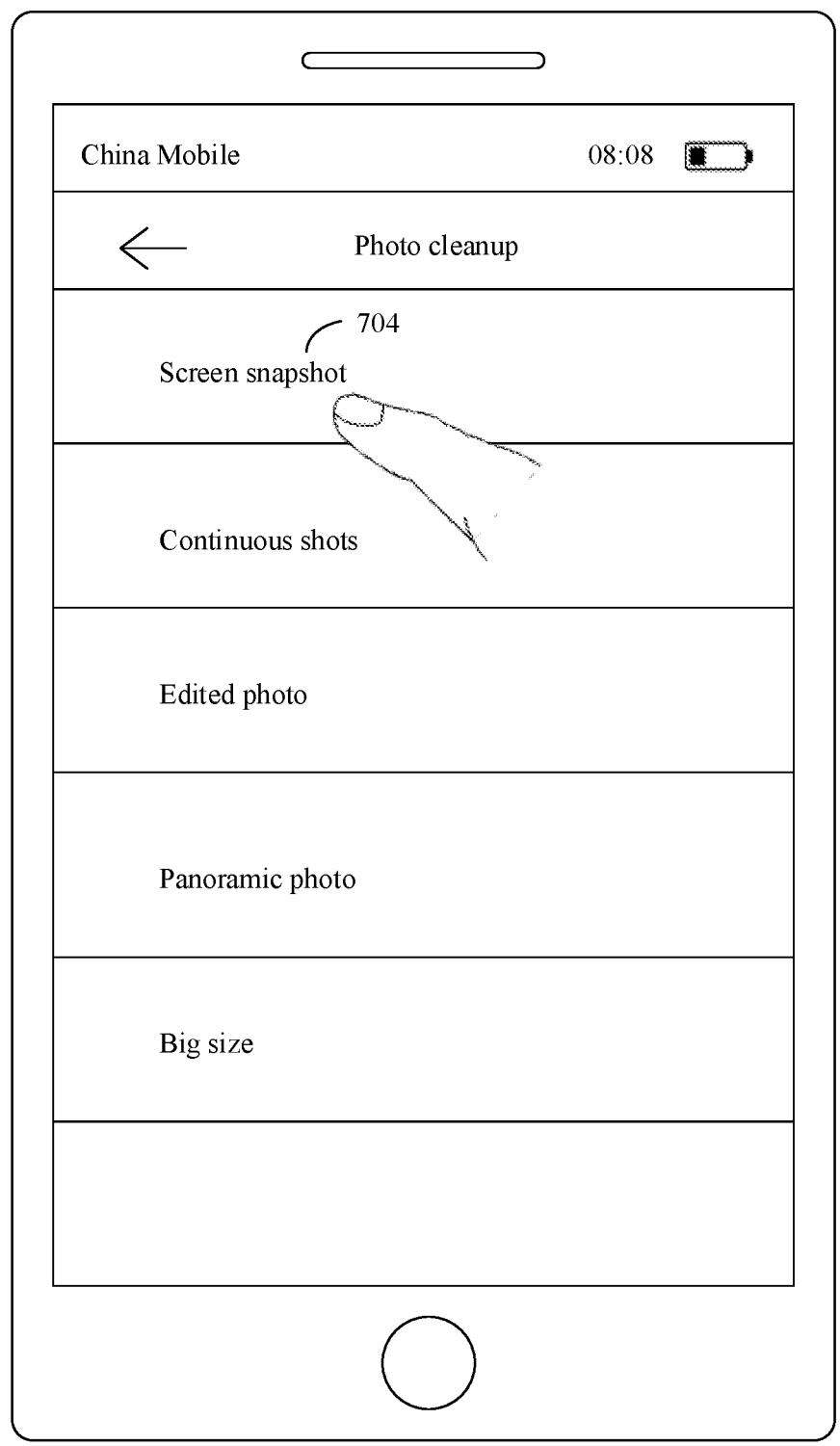
FIG. 7D is a schematic diagram 20 of an example of a terminal interface according to an embodiment of this application.
Figure 7E:
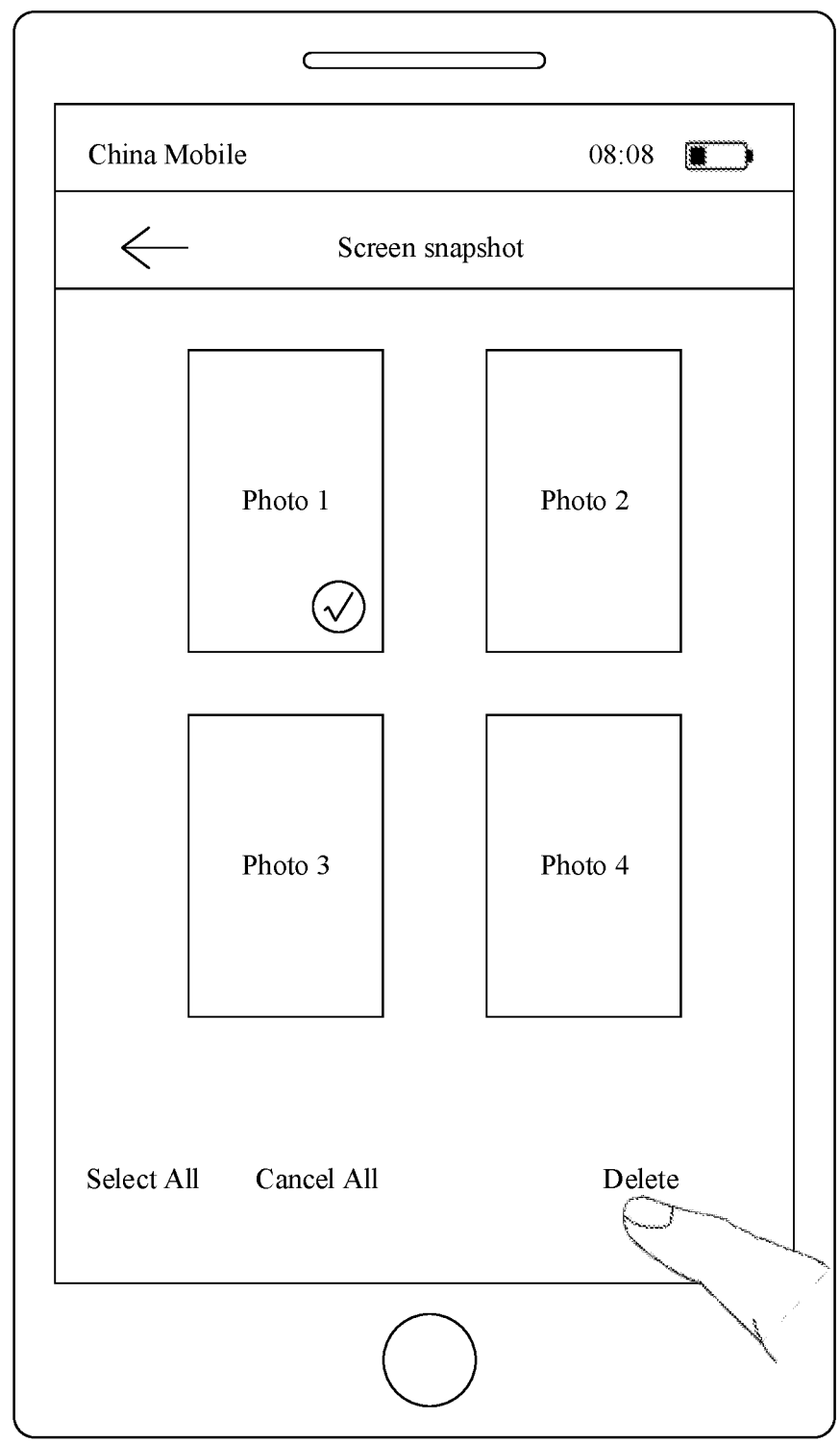
FIG. 7E is a schematic diagram 21 of an example of a terminal interface according to an embodiment of this application.
Figure 7F:
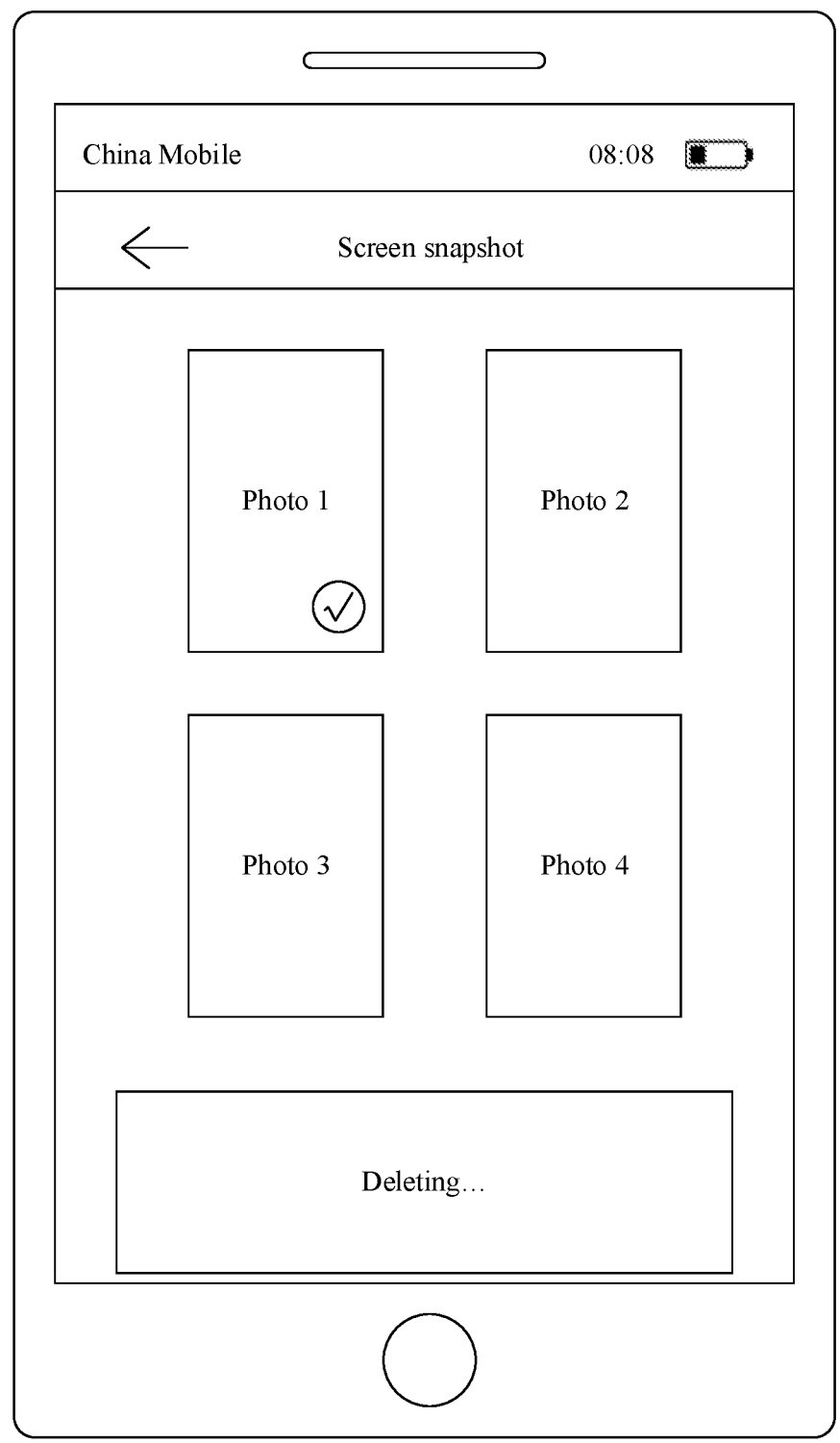
FIG. 7F is a schematic diagram 22 of an example of a terminal interface according to an embodiment of this application.

FIG. 7A shows the main screen interface of the terminal. The user taps an application icon 701 of the "Mobile phone manager" to enter a main interface of the "Mobile phone manager" application. As shown in FIG. 7B, the user taps a "Comprehensive cleanup optimization" button 702 to enter a "Comprehensive cleanup optimization" interface shown in FIG. 7C. In the interface, the user may tap a "Photo cleanup" button 703 to enter an interface of clearing a photo shown in FIG. 7D. In the interface, the user may tap a "Screen snapshot" button 704 to enter an interface of clearing a screen snapshot. FIG. 7E shows an interface of clearing a screen snapshot by the terminal. The user may select a picture file "Photo 1" and tap a "Delete" button. As shown in FIG. 7F, the terminal performs an operation of deleting the "Photo 1". The process includes that the terminal determines whether the deleting operation is a behavior that needs to be controlled. In this example, the terminal determines that the deleting operation is a behavior that needs to be controlled, and therefore moves the picture file to the "Recycle bin". In this case, the terminal displays an interface shown in FIG. 7G. For a detailed process, reference may be made to a description of the foregoing example, and details are not described herein again.

Figure 7G:
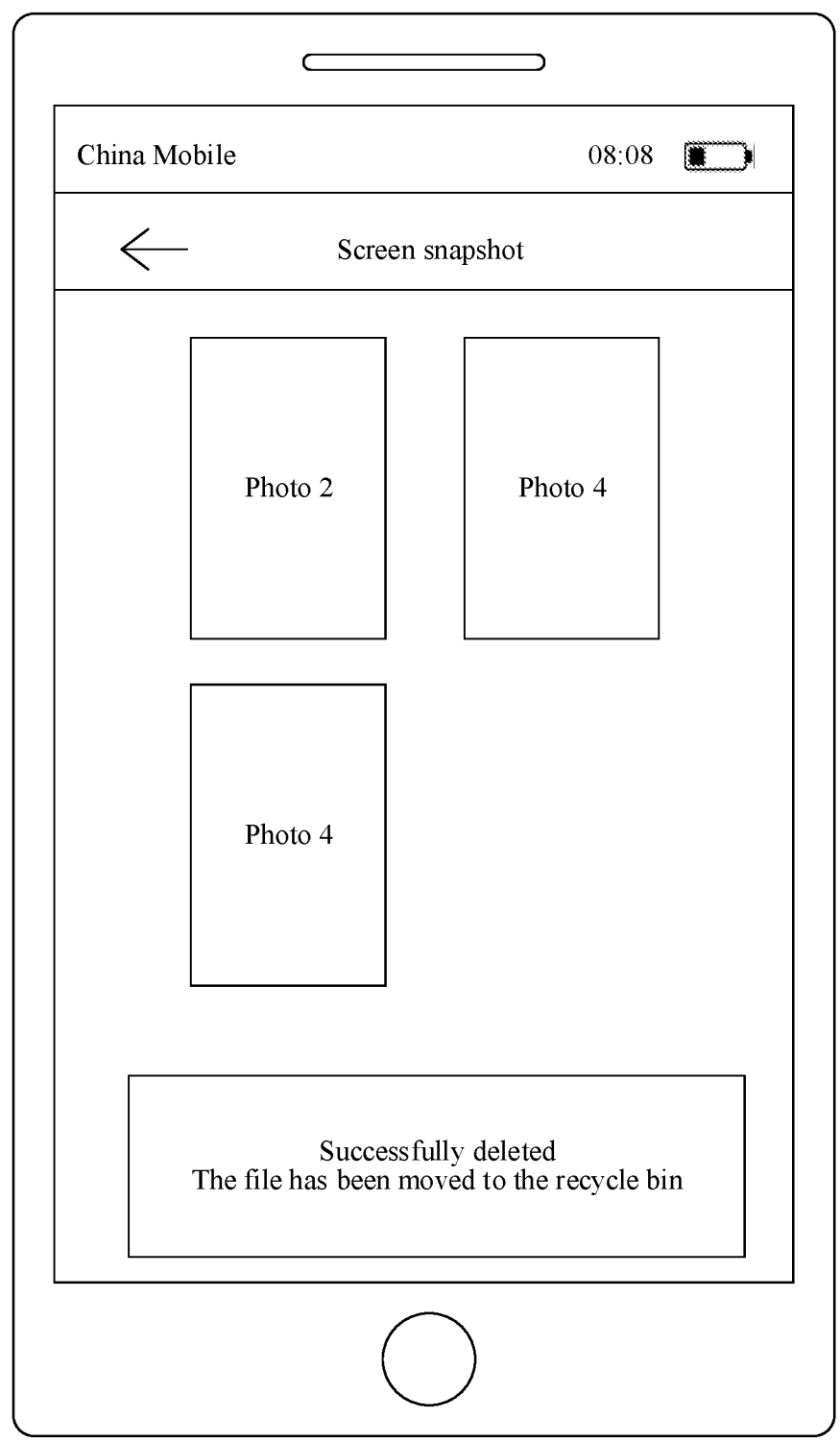
FIG. 7G is a schematic diagram 23 of an example of a terminal interface according to an embodiment of this application.

It should be noted that, as shown in FIG. 7G, in an interface of the "Screen snapshot", the user cannot see the file of the "Photo 1". In addition, in the "Gallery" application, the user also cannot see the "Photo 1". For the user, it may be considered that the picture file has been deleted.

Then, in some examples, the user may view or even restore, by using an application in the "Recycle bin", a file deleted by the "Mobile phone manager".

Figure 7H:
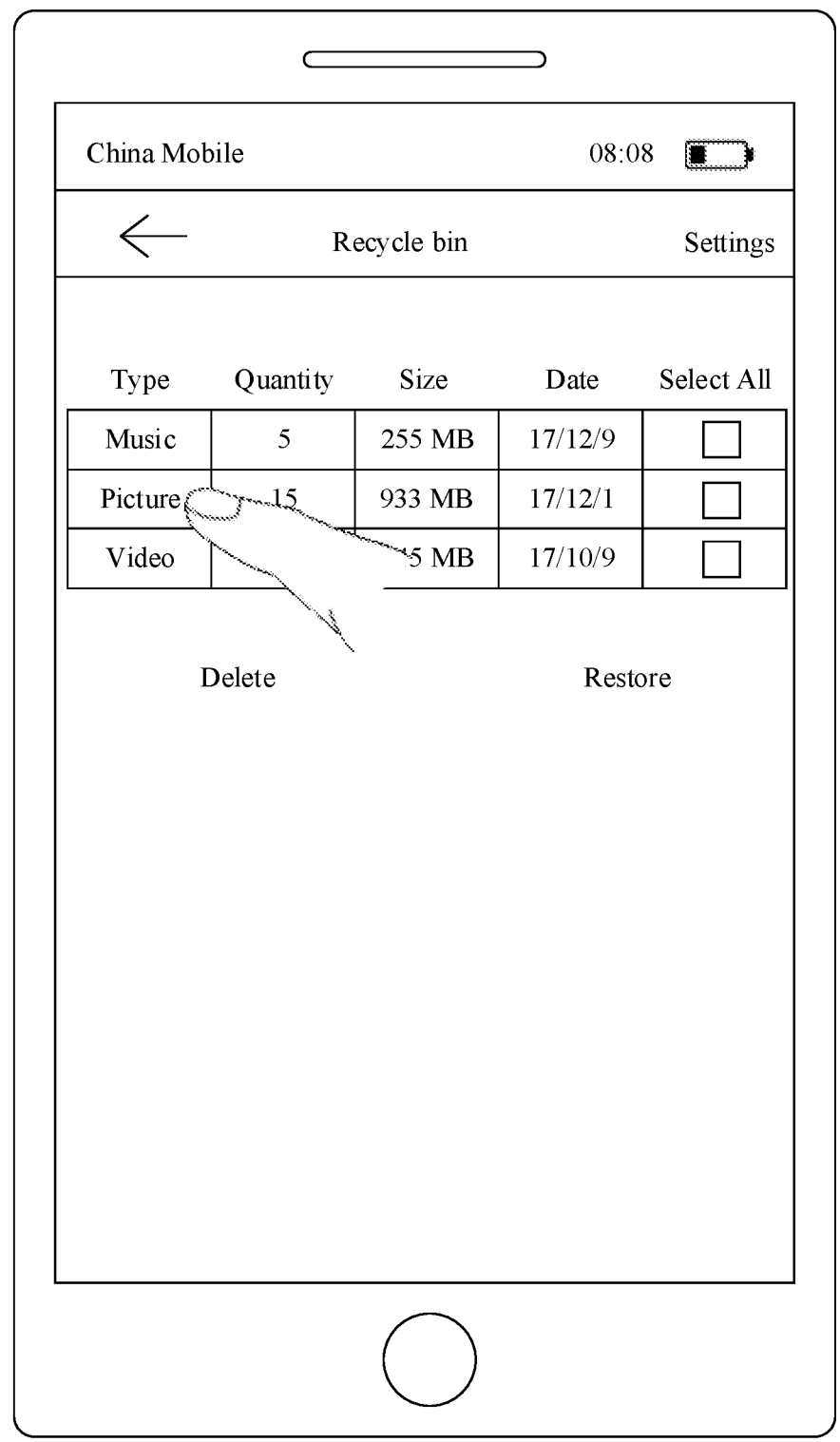
FIG. 7H is a schematic diagram 24 of an example of a terminal interface according to an embodiment of this application.

As shown in FIG. 7H, the user enters the main interface of the "Recycle bin" application, and the user may view, by using the interface, files deleted by some applications in the terminal. The files are files deleted by deleting operations that the terminal determines need to be controlled. The user may view types, quantities, sizes, deletion time, and the like of the deleted files. For example, the user taps a "Picture" in the interface, and the terminal enters an interface shown in FIG. 7I, where detailed information about the deleted picture is displayed in the interface.

Figure 7I:
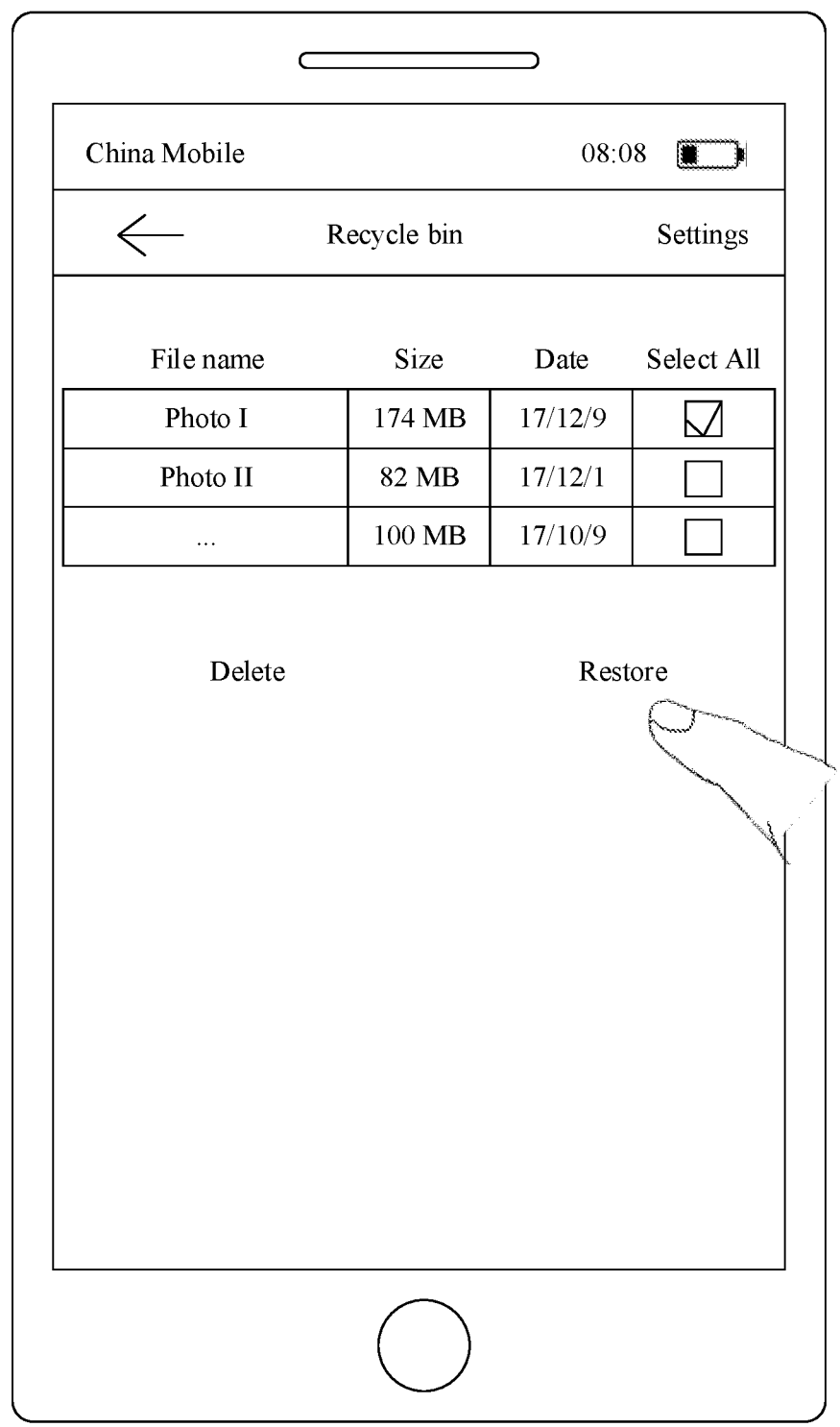
FIG. 7I is a schematic diagram 25 of an example of a terminal interface according to an embodiment of this application.

In the interface shown in FIG. 7I, the user selects a picture file of a "Picture 1", and taps a "Restore" button, so that the terminal may restore the picture file to the "Gallery" application. That is, after the terminal restores the picture file of the "Photo 1", the user can view the picture file of the "Photo 1" after entering the "Gallery" application again.

It may be understood that, each terminal interface in FIG. 7A to FIG. 7I may be an independent interface, there may be no relationship between diagrams in FIG. 7A to FIG. 7I, and each terminal interface in FIG. 7A to FIG. 7I is an independent embodiment schematic diagram.

It may be understood that, to implement the foregoing functions, the terminal includes corresponding hardware structures and/or software modules for performing the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present description.

In the embodiments of this application, functional modules of the terminal may be divided according to the foregoing method examples. For example, functional modules may be divided corresponding to functions, or two or more functions may be integrated into one processing module. The integrated module may be implemented in a form of hardware, or may be implemented in a form of a software functional module. It should be noted that, in this embodiment, module division is exemplary, and is merely a logical function division. In actual implementation, another division manner may be used.

Figure 8:
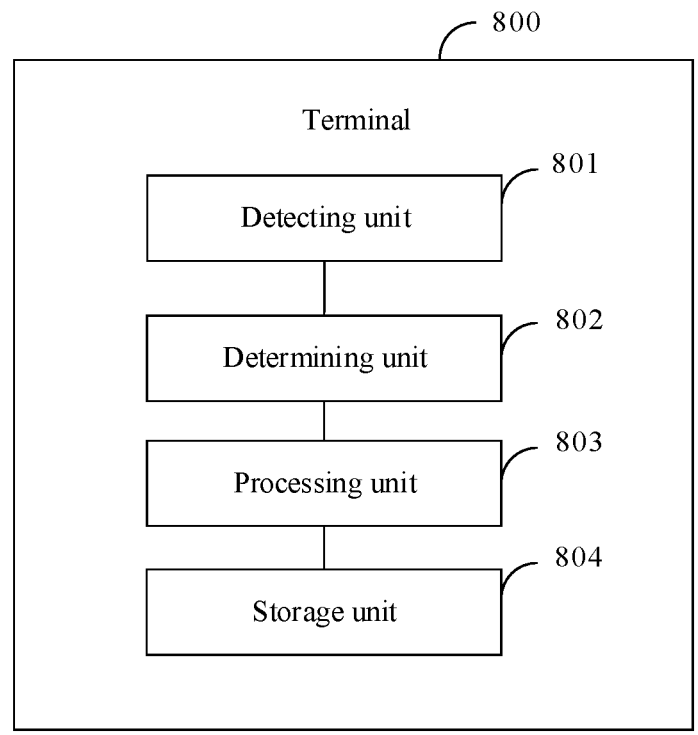
FIG. 8 is a schematic structural diagram 3 of a terminal according to an embodiment of this application.

When the functional modules are divided corresponding to the functions, FIG. 8 is a possible schematic structural diagram of the terminal according to the foregoing embodiment. As shown in FIG. 8, the terminal 800 includes: a detecting unit 801, a determining unit 802, a processing unit 803, and a storage unit 804.

The detecting unit 801 is configured to support the terminal in performing step S101 in FIG. 3, step S201 in FIG. 5A, step S301 in FIG. 5B, step S401 in FIG. 5C, and/or another process of the technology described in this specification. The determining unit 802 is configured to support the terminal in performing step S103 in FIG. 3, step S204 in FIG. 5A, and/or another process of the technology described in this specification. The processing unit 803 is configured to support the terminal in performing steps S102, S104, and S105 in FIG. 3, steps S202, S203, and S205 to S208 in FIG. 5A, step S302 in FIG. 5B, and step S402 in FIG. 5C, and/or another process of the technology described in this specification. The storage unit 804 is configured to support the terminal in performing step S303 in FIG. 5B, step S403 in FIG. 5B, and/or another process of the technology described in this specification.

All related content of the steps in the foregoing method embodiments may be cited in function descriptions of corresponding functional modules. Details are not described herein again.

Certainly, the terminal 800 may further includes a communications unit for the terminal to exchange with another device. In addition, specific functions that can be implemented by the foregoing function units include but are not limited to the functions corresponding to the method steps in the foregoing examples. For a detailed description of another unit of the terminal 800, refer to a detailed description of a method step corresponding to the unit, and in this embodiment of this application, details are not described herein again.

When an integrated unit is used, the detecting unit 801 and the determining unit 802 may be integrated together, and may be a processing module of the terminal. The communications unit may be a communications module in the terminal, for example, an RF circuit, a Wi-Fi module, or a Bluetooth module. The storage unit 804 may be a storage module in the terminal.

Figure 9:
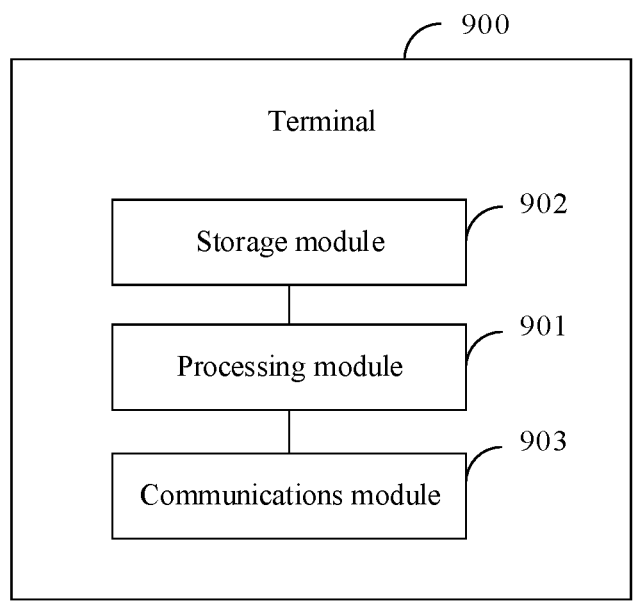
FIG. 9 is a schematic structural diagram 4 of a terminal according to an embodiment of this application.

FIG. 9 is a possible schematic structural diagram of the terminal according to the foregoing embodiment. The terminal 900 includes a processing module 901, a storage module 902, and a communications module 903. The processing module 901 is configured to control and manage an action of the terminal. The storage module 902 is configured to store program code and data of the terminal. The communications module 903 is configured to communicate with another terminal. The processing module 901 may be a processor or a controller, such as a central processing unit ( ), a general-purpose processor, a digital signal processor (DSP), an application-specific integrated circuit (ASIC), a field programmable gate array (FPGA), or another programmable logical device, a transistor logical device, a hardware component, or any combination thereof. The controller/processor may implement or execute various example logical blocks, modules, and circuits described with reference to content disclosed. The processor may be a combination of processors implementing a computing function, for example, a combination of one or more microprocessors, or a combination of the DSP and a microprocessor. A communications module 1303 may be a transceiver, a receiving and transmitting circuit, a communications interface, or the like. The storage module 902 may be a memory.

When the processing module 901 is a processor (for example, the processor 101 shown in FIG. 2), the communications module 903 is an RF receiving and transmitting circuit (for example, the radio frequency circuit 102 shown in FIG. 2), and the storage module 902 is a memory (for example, the memory 103 shown in FIG. 2), the terminal provided in this embodiment of this application may be the terminal 100 shown in FIG. 2. The communications module 903 may include not only an RF circuit, but also a Wi-Fi module and a Bluetooth module. Communications modules such as the RF circuit, the Wi-Fi module, and the Bluetooth module may be collectively referred to as communications interfaces. The processor, the communications interface and the memory may be coupled together by using a bus.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the apparatus and method may be implemented in another manner. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely example implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for protecting application data, the method comprising:
   detecting, by a processor, a deleting operation performed by a first application on first data stored in a first memory location, the first application being a third-party application running in a background operating state when the deleting operation is performed, the third-party application being other than a system-level application recognized by the processor as being preset in a terminal comprising the processor;
   determining, based on a preset condition, whether to delete the first data of the first application;
   in response to a determination that the first application is third-party application running in the background operating state, determining the preset condition is met and renaming the first data of the first application; and
   storing the renamed first data in a second memory location different from the first memory location, wherein storing the renamed first data in the second memory location causes the first data to be in an invisible state to the first application.

2. The method according to claim 1, wherein the determination of whether the preset condition is met is further based on a determination of whether the first application is a preset application.

3. The method according to claim 2, wherein the determination of whether the preset condition is met is further based on a determination of whether the first application is an application of a preset type.

4. The method according to claim 2, wherein the determination of whether the preset condition is met is further based on a determination of whether the first data is located at a preset file location, and whether the first data is a preset file type.

5. The method according to claim 4, wherein the renaming of the first data of the first application comprises:
renaming the first data of the first application based on the preset file location and the preset file type.

6. The method according to claim 4, wherein the determination of whether preset condition is met is further based on a determination of whether the first data meets a preset file size, and whether creation time of the first data is in a preset time period.

7. The method according to claim 6, wherein the renaming of the first data of the first application comprises:
renaming the first data of the first application based on the preset file location, the preset file type, the preset file size, and the creation time of the first data in the preset time period.

8. The method according to claim 1, wherein the first data is one or more of a picture, audio, a video, a document, a database, or a record in the database.

9. A terminal, comprising: a processor, a memory, and a touchscreen, wherein the memory and the touchscreen are coupled to the processor, the memory is configured to store computer program code, the computer program code comprises a computer instruction, and when the computer program code is executed by the processor, the terminal is caused to:
detect a deleting operation performed by a first application on first data stored in a first memory location, the first application being a third-party application running in a background operating state when the deleting operation is performed, the third-party application being other than a system-level application recognized by the processor as being preset in the terminal;
determine, based on a preset condition, whether to delete the first data of the first application;
in response to a determination that the first application is third-party application running in the background operating state, determine the preset condition is met and rename the first data of the first application; and
store the renamed first data in a second memory location different from the first memory location,
wherein storing the renamed first data in the second memory location causes the first data to be in an invisible state to the first application.

10. The terminal according to claim 9, wherein the terminal is caused to determine whether the preset condition is met based on a determination of whether the first application is an application of a preset type.

11. The terminal according to claim 10, wherein the terminal is caused to rename the first data of the first application based on a preset file location and the preset file type.

12. The terminal according to claim 11, wherein the terminal is further caused to determine whether the preset condition is met based on a determination of whether the first data meets a preset file size, and whether creation time of the first data is in a preset time period.

13. The terminal according to claim 12, wherein the terminal is caused to rename the first data of the first application based on the preset file location, the preset file type, the preset file size, and the creation time of the first data in the preset time period.

14. The terminal according to claim 9, wherein the first data is one or more of a picture, audio, a video, a document, a database, or a record in the database.

15. A non-transitory computer readable storage medium having instructions stored thereon that, when executed by a processor, cause an apparatus to:
detect a deleting operation performed by a first application on first data stored in a first memory location, the first application being a third-party application running in a background operating state when the deleting operation is performed, the third-party application being other than a system-level application recognized by the processor as being preset in a terminal;
determine, based on a preset condition, whether to delete the first data of the first application;
in response to a determination that the first application is third-party application running in the background operating state, determine the preset condition is met and rename the first data of the first application; and
store the renamed first data in a second memory location different from the first memory location,
wherein storing the renamed first data in the second memory location causes the first data to be in an invisible state to the first application.

16. The non-transitory computer readable storage medium according to claim 15, wherein the apparatus is further caused to determine whether the preset condition is met based on a determination of whether the first data is located at a preset file location, and whether the first data is a preset file type.

17. The non-transitory computer readable storage medium according to claim 16, wherein the apparatus is caused to rename the first data of the first application based on the preset file location and the preset file type.

* * * * *